US010506109B2

(12) United States Patent
Hirooka et al.

(10) Patent No.: US 10,506,109 B2
(45) Date of Patent: Dec. 10, 2019

(54) INFORMATION PROCESSING APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Shigeki Hirooka, Kawasaki (JP); Tatsuya Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 15/628,118

(22) Filed: Jun. 20, 2017

(65) Prior Publication Data
US 2017/0366685 A1 Dec. 21, 2017

(30) Foreign Application Priority Data

Jun. 21, 2016 (JP) ................................ 2016-122876
Jun. 21, 2016 (JP) ................................ 2016-122877

(51) Int. Cl.
*G06K 9/00* (2006.01)
*H04N 1/00* (2006.01)
(Continued)

(52) U.S. Cl.
CPC ......... *H04N 1/00183* (2013.01); *G06T 7/001* (2013.01); *H04N 5/23222* (2013.01); *H04N 5/225* (2013.01)

(58) Field of Classification Search
None
See application file for complete search history.

(56) References Cited

U.S. PATENT DOCUMENTS 9,671,862 B2* 6/2017 Govindarajeswaran ..................... G06F 16/54
2004/0208475 A1* 10/2004 Ohmura ............. H04N 1/00183 386/224
(Continued)

FOREIGN PATENT DOCUMENTS

| JP | 2003-006510 A | 1/2003 |
| JP | 2008-299472 A | 12/2008 |
| JP | 2011-041042 A | 2/2011 |

OTHER PUBLICATIONS

Ravi et al. "A Collaborative Location Based Travel Recommendation System through Enhanced Rating Prediction for the Group of Users", Hindawi Publishing Corporation, Computational Intelligence and Neuroscience, vol. 2016, Article ID 1291358, 28 pages (Year: 2016).*

(Continued)

*Primary Examiner* — Randolph I Chu
(74) *Attorney, Agent, or Firm* — Carter, DeLuca & Farrell LLP

(57) ABSTRACT

An information processing apparatus operable to decide an item related to an image or image capturing for a recommendation to a user, the apparatus obtains image attribute information, derives image group attribute information for an image group including a plurality of images based on the image attribute information, compares image group attribute information derived for a first image group including images captured in a first time range and image group attribute information derived for a second image group including images captured in a second time range different to the first time range, and decides the item for the recommendation to the user in accordance with a result of the comparison.

11 Claims, 24 Drawing Sheets

(51) Int. Cl.
*G06T 7/00* (2017.01)
*H04N 5/232* (2006.01)
*H04N 5/225* (2006.01)

(56) References Cited

U.S. PATENT DOCUMENTS

2014/0108501 A1* 4/2014 Papakipos ............. G06F 16/583
709/203
2016/0026853 A1* 1/2016 Wexler ................ H04N 5/2257
382/103

OTHER PUBLICATIONS

Cao et al., "Aworldwide Tourism Recommendation System Based on Geotaggedweb Photos", 2010 IEEE International Conference on Acoustics, Speech, and Signal Processing, ICASSP (Year: 2010).*
McAuley et al. "Image-based Recommendations on Styles and Substitutes", Computer Vision and Pattern Recognition (cs.CV); Information Retrieval (cs.IR) (Year: 2015).*
Geng et al. "Learning Image and User Features for Recommendation in Social Networks", 2015 IEEE International Conference on Computer Vision (Year: 2015).*
Clements et al., "Personalised Travel Recommendation based on Location Co-occurrence", IEEE Transactions on Knowledge and Data Engineering, Jun. 2011 (Year: 2011).*
Yan, "Web Recommendation System with Image Retrieval", Examensarbete 30 hp Jun. 2011 (Year: 2011).*

* cited by examiner

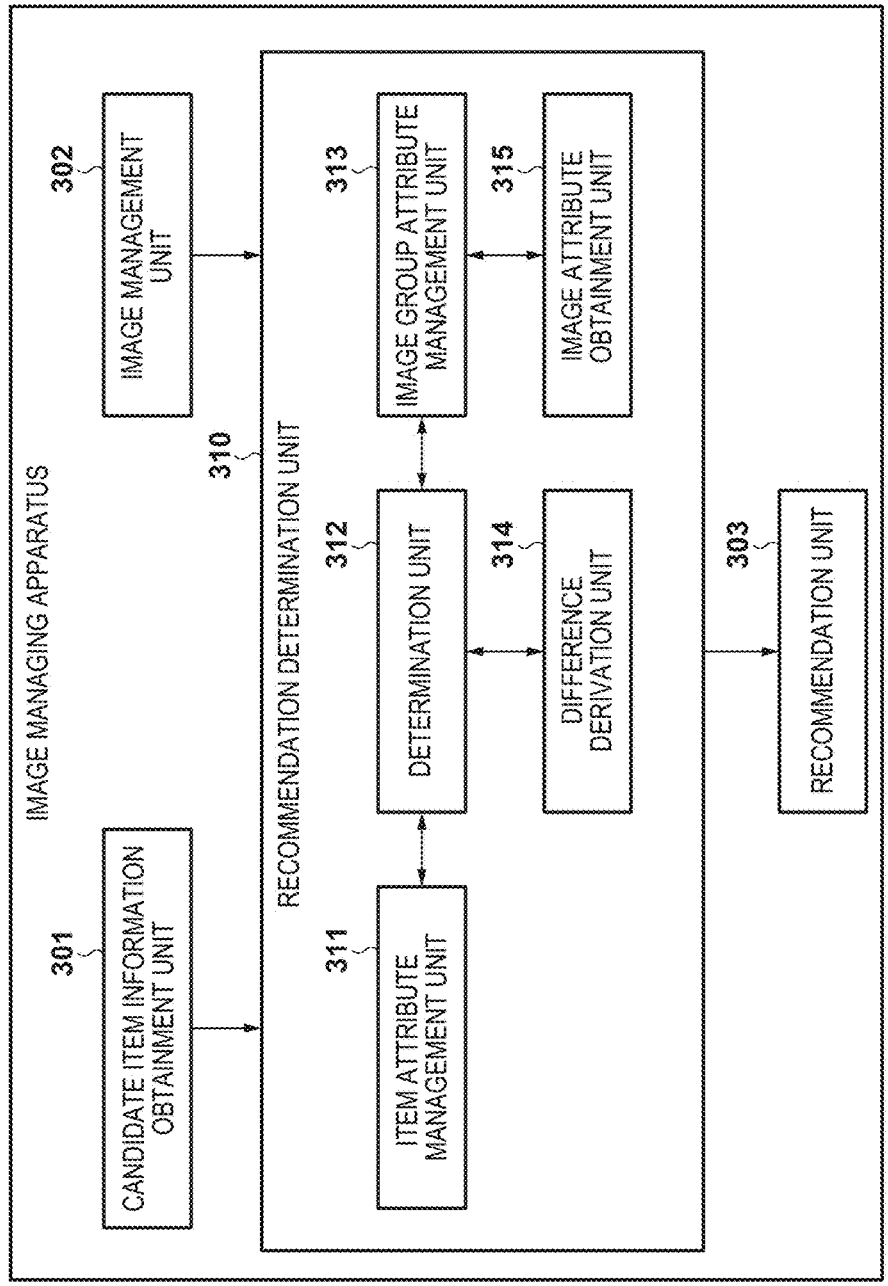

FIG. 4

| ID | ITEM TYPE | ATTRIBUTE TYPE |
|---|---|---|
| 401 | EF14mm F2.8L II USM | OBJECT DISTANCE EQUAL TO OR MORE THAN 10m |
| 402 | EF50mm F1.2L USM | OBJECT DISTANCE 50cm-10m |
| 403 | EF300mm F2.8L IS II USM | OBJECT DISTANCE EQUAL TO OR MORE THAN 10m |
| 404 | EF100mm F2.8L MACRO IS USM | OBJECT DISTANCE 0-50cm |
| ... | ... | ... |

FIG. 5A

| ID | ATTRIBUTE TYPE | CAPTURE COUNT RATIO |
|---|---|---|
| 501 | OBJECT DISTANCE 0-50cm | 0.78 |
| 502 | OBJECT DISTANCE 50cm-10m | 0.22 |
| 503 | OBJECT DISTANCE EQUAL TO OR MORE THAN 10m | 0.0 |

FIG. 5B

| ID | ATTRIBUTE TYPE | CAPTURE COUNT RATIO |
|---|---|---|
| 551 | OBJECT DISTANCE 0-50cm | 0.03 |
| 552 | OBJECT DISTANCE 50cm-10m | 0.38 |
| 553 | OBJECT DISTANCE EQUAL TO OR MORE THAN 10m | 0.59 |

FIG. 9

| ID | ITEM TYPE | ATTRIBUTE TYPE | LAST RECOMMENDED DATE |
|---|---|---|---|
| 901 | EF14mm F2.8L II USM | MAIN OBJECT: LANDSCAPE | — |
| 902 | EF85mm F1.8 USM | MAIN OBJECT: PERSON | — |
| 903 | EF100mm F2.8L MACRO IS USM | MAIN OBJECT: FLOWER | 2015/9/19 |
| ... | ... | ... | ... |

FIG. 10

| ID 1010 | MAIN OBJECT 1020 | FIRST IMAGE CAPTURING DATE AND TIME 1030 | LAST IMAGE CAPTURING DATE AND TIME 1040 | |
|---|---|---|---|---|
| 1001 | PERSON | 2015/09/19 18:12 | 2015/09/19 18:43 | ⎫ IMAGE CAPTURING OPPORTUNITIES OF RECENT N TIMES |
| 1002 | PERSON | 2015/09/18 18:20 | 2015/09/19 18:56 | |
| 1003 | PERSON | 2015/09/17 18:01 | 2015/09/17 18:59 | |
| 1004 | PERSON | 2015/09/16 13:51 | 2015/09/16 19:20 | |
| 1005 | LANDSCAPE | 2015/09/15 9:21 | 2015/09/15 16:15 | ⎭ |
| 1006 | PERSON | 2015/08/15 13:30 | 2015/08/15 17:07 | ⎫ IMAGE CAPTURING OPPORTUNITIES BEFORE RECENT N TIMES |
| 1007 | PERSON | 2015/05/05 9:08 | 2015/05/05 15:43 | |
| 1008 | PERSON | 2015/01/01 10:19 | 2015/01/01 10:31 | |
| 1009 | LANDSCAPE | 2014/12/24 19:02 | 2014/12/24 20:18 | ⎭ |
| ... | ... | ... | ... | |

TIME INTERVAL BETWEEN IMAGE CAPTURING OPPORTUNITIES

1000

F I G. 14
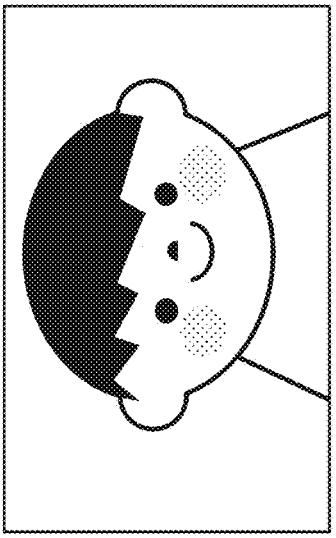
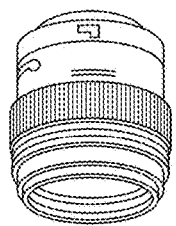

FIG. 16

| ID | ITEM TYPE | CAMERA TYPE | CAPTURED SCENE |
|---|---|---|---|
| 1 | SINGLE FOCUS LENS | SINGLE LENS REFLEX CAMERA | PERSON |
| 2 | NORMAL ZOOM LENS | SINGLE LENS REFLEX CAMERA | TRAVEL |
| 3 | TELEPHOTO ZOOM LENS | SINGLE LENS REFLEX CAMERA | SPORTS |
| ... | ... | ... | ... |
| 8 | SINGLE FOCUS M LENS | MIRROR-LESS CAMERA | PERSON |
| 9 | NORMAL ZOOM M LENS | MIRROR-LESS CAMERA | TRAVEL |

FIG. 17

| 1701 | 1702 | 1703 | 1704 | 1705 1700 |
|---|---|---|---|---|
| ID | CAPTURE DATE | CAMERA TYPE | CAPTURED SCENE | NUMBER OF CAPTURES |
| 1 | 2013/4/15 | MIRROR-LESS CAMERA | PERSON | 5 |
| 2 | 2013/4/29 | SINGLE LENS REFLEX CAMERA | PERSON | 11 |
| 3 | 2013/5/3 | MIRROR-LESS CAMERA | TRAVEL | 55 |
| 4 | 2013/5/4 | MIRROR-LESS CAMERA | TRAVEL | 102 |
| 5 | 2013/5/5 | MIRROR-LESS CAMERA | TRAVEL | 75 |
| 6 | 2013/6/3 | SINGLE LENS REFLEX CAMERA | FLOWER | 7 |
| 7 | 2013/6/3 | SINGLE LENS REFLEX CAMERA | PERSON | 13 |
| ... | | | | |
| 16 | 2013/9/10 | SINGLE LENS REFLEX CAMERA | PERSON | 12 |
| 17 | 2013/10/3 | SINGLE LENS REFLEX CAMERA | SPORTS | 133 |
| 18 | 2013/10/24 | MIRROR-LESS CAMERA | PERSON | 11 |
| ... | | | | |
| 71 | 2015/7/18 | SINGLE LENS REFLEX CAMERA | FLOWER | 8 |
| 72 | 2015/7/18 | MIRROR-LESS CAMERA | FLOWER | 10 |
| 73 | 2015/8/6 | SINGLE LENS REFLEX CAMERA | PERSON | 15 |

INFORMATION PROCESSING APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to an information processing apparatus, a method of controlling the same, and a non-transitory computer-readable storage medium.

Description of the Related Art

In recent years, it is common to promote sales by recommending image capturing equipment such as cameras and lenses by methods such as direct mailing. However, image capturing styles of users vary and there are many different types of image capturing equipment. Also, there is no limitation to only image capturing equipment, and there are many useful items relating to images. Narrowing down and recommending items that are optimal for a user is desired because it becomes bothersome for the user if every type of item is recommended.

In such an environment, a method for selecting and recommending image capturing equipment that is suitable to a user by analyzing images that the user has captured has been proposed. For example, a method for recommending image capturing equipment suited to a capturing theme or failure avoidance by using a capturing theme obtained by analyzing an image when a user posts images to a posting site, information such as a cause of failure, or the like is proposed in Japanese Patent Laid-Open No. 2008-299472. Also, a method in which, when a user requests advice about image editing that is optimal for an image, a system analyzes the image and gives image editing advice, as well as recommending image capturing equipment that can capture images similar to an edited image is proposed in Japanese Patent Laid-Open No. 2003-006510. Also, a method for recommending, based on image capturing conditions when a user captures an image and image evaluation results, image capturing equipment suited to the image capturing conditions in which the capturing skill of the photographer is low and the number of captures is high is proposed in Japanese Patent Laid-Open No. 2011-041042.

However, the object that the user wishes to capture and the image capturing environment in which the user wishes to take photographs may change over time rather than remaining the same. To recommend image capturing equipment items more effectively, it is desirable to recommend an item suited to a new image capturing environments or object when there was a change in the environment in which or the object that the user frequently captures, rather than rushing into making recommendations. For example, it is desirable to recommend items suited for capturing children or suited for capturing with a lot of movement respectively to users who often capture a newborn child or who often capture a sport that their child newly took up.

Since items are recommended every time an image is posted in the methods of Japanese Patent Laid-Open No. 2008-299472 and Japanese Patent Laid-Open No. 2003-006510, the timing of the recommendations is not suitable to the user. Also, since a change in the image capturing environment or object is not considered in the method of Japanese Patent Laid-Open No. 2011-041042, there is the possibility that the recommendation is not necessarily suited to the main image capturing condition of the current user.

SUMMARY OF THE INVENTION

The present invention provides a technique for performing a recommendation (presentation) of items relating to image capturing at a suitable timing for a user, in view of the problems described above.

According to one aspect of the present invention, there is provided an information processing apparatus operable to decide an item related to an image or image capturing for a recommendation to a user, which comprises: an obtainment unit configured to obtain image attribute information; a derivation unit configured to derive image group attribute information for an image group including a plurality of images based on the image attribute information; a comparison unit configured to compare image group attribute information that the derivation unit derived for a first image group including images captured in a first time range and image group attribute information that the derivation unit derived for a second image group including images captured in a second time range different to the first time range; and a decision unit configured to decide the item for the recommendation to the user in accordance with a result of the comparison by the comparison unit.

Further features of the present invention will become apparent from the following description of exemplary embodiments (with reference to the attached drawings).

BRIEF DESCRIPTION OF THE DRAWINGS

FIG. 3 illustrates an example of a functional configuration of the image managing apparatus in a first embodiment.

FIG. 4 illustrates one example of an item attribute information management table according to a first embodiment.

FIGS. 5A and 5B illustrate examples of an image group attribute information management table according to a first embodiment.

FIG. 9 illustrates an example of an item attribute information management table according to the second embodiment.

FIG. 10 illustrates an example of an image group attribute information management table according to the second embodiment.

FIG. 14 is a conceptual diagram illustrating an example of a display recommending an item according to the second embodiment.

FIG. 16 illustrates one example of an item attribute information management table.

FIG. 17 is a view illustrating an example of a capture history table.

DESCRIPTION OF THE EMBODIMENTS

Below, with reference to the attached drawings, a detailed explanation is given for the present invention based on embodiments. Note that configurations illustrated in the following embodiments are merely examples, and the present invention is not limited to the illustrated configurations.

First Embodiment

Description is given as a first embodiment regarding an item recommendation system for determining whether to recommend to a user a recommendation candidate item (hereinafter referred to as a candidate item) that becomes a candidate to be recommended (presented) and determining that the candidate item will be recommended to the user in a case when the decision is to recommend the item. Note, although "item" in the description hereinafter is a lens, it may be anything as long as it is an item relating to an image or image capturing such as image capturing equipment such as a camera body or a tripod, a printer, and an image editing application. In addition, camera bags, apparel, travel, travel related products, sports related products, and the like may be handled as recommended items if they can be associated with image information.

Figure 1:
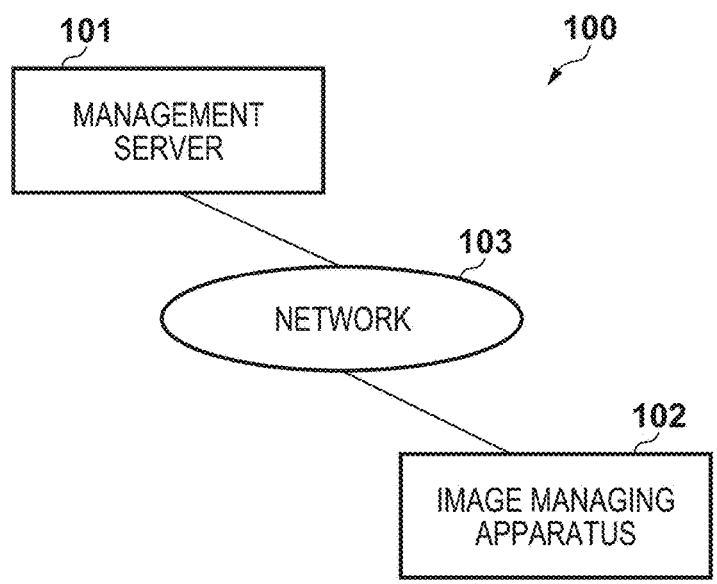
FIG. 1 illustrates an example of a configuration of an item recommending system.

FIG. 1 illustrates an example of a configuration of an item recommendation system 100 in the present embodiment. The item recommendation system 100 is configured from a management server 101, an image managing apparatus 102, and a network 103.

The management server 101 manages information of a candidate item. An item type of a candidate item (for example, refer to FIG. 4), a URL of a Web page on which information of the candidate item is described, and the like are included in the information of the candidate item. The image managing apparatus 102 functions as an information processing apparatus and is an apparatus such as a digital camera, a photo storage, a server on a network, or a personal computer that manages images that the user captured. The image managing apparatus 102 is not particularly restricted as long as it is an apparatus for saving and managing images. The image managing apparatus 102 obtains the information of a candidate item from the management server 101 via the network 103 which may be the Internet. The image managing apparatus 102 recommends the candidate item to the user by using an output unit 207 to output the information of the candidate item in a case when it is determined to recommend the obtained candidate item.

Figure 2:
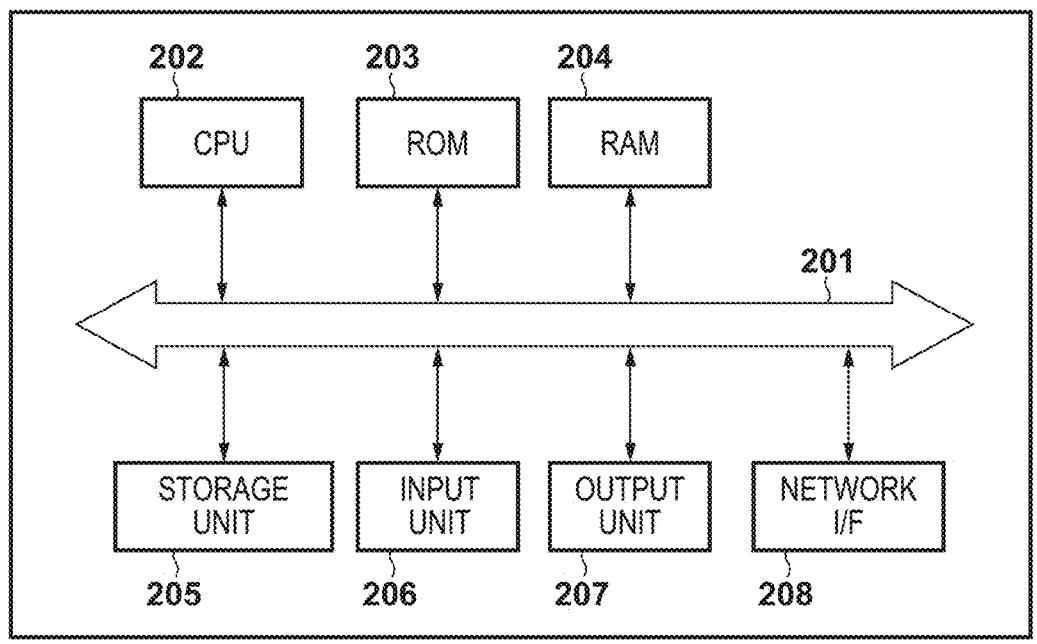
FIG. 2 illustrates an example of a hardware configuration of an image managing apparatus.

FIG. 2 illustrates an example of a hardware configuration of the image managing apparatus 102. A CPU (Central Processing Unit) 202 is a central arithmetic processing device that performs arithmetic operations and logical determinations for various processing described later. The CPU 202 controls each configuration element (203 through 208) connected to a system bus 201 to exchange data and commands. A ROM (Read Only Memory) 203 and a RAM (Random Access Memory) 204 function as a program memory and/or a data memory. Note, programs for control by the CPU 202, including the processing procedures described later, are stored in the program memory. The RAM 204 can store programs loaded from a storage unit 205 and the like in a case when the RAM 204 functions as a program memory. The storage unit 205 is a hard disk or the like that stores image data and programs. An input unit 206 is a mouse, a keyboard, a tablet, or the like for a user to perform operations or input of information. The output unit 207 is a display (display unit) or the like that includes a circuit for outputting such as a graphic controller or the like. A network IF (interface) 208 performs input/output control of data such as information of a candidate item, image data, or the like transmitted to/received from the management server 101 via the network 103.

FIG. 3 illustrates an example of a functional configuration of the image managing apparatus 102 in the present embodiment. The image managing apparatus 102 is configured from a candidate item information obtainment unit 301, an image management unit 302, a recommendation determination unit 310, and a recommendation unit 303 as a functional configuration.

The candidate item information obtainment unit 301 obtains information of a candidate item from the management server 101. The image management unit 302 saves and manages images that a user captured in the past. A description regarding the recommendation determination unit 310 is given later. When it is determined by the recommendation determination unit 310 to recommend a candidate item, the recommendation unit 303 recommends the candidate item to the user by displaying information of the candidate item to the display which is the output unit 207.

Next, description is given regarding the recommendation determination unit 310. The recommendation determination unit 310 has an item attribute management unit 311, a determination unit 312, an image group attribute management unit 313, a difference derivation unit 314, and an image attribute obtainment unit 315. The recommendation determination unit 310 uses these configuration elements (311 through 315) to determine whether to recommend the candidate item based on information of the candidate item obtained from the candidate item information obtainment unit 301 and information of the image obtained from the image management unit 302.

The item attribute management unit 311 manages an attribute type corresponding to an item type by an item attribute information management table. Description regarding a management method of an attribute type by the item attribute management unit 311 is given using FIG. 4.

The image attribute obtainment unit 315 obtains an image from the image management unit 302 and uses metadata such as Exif attached to the image or a result obtained by analyzing the image to obtain attribute information of the image. The image group attribute management unit 313 derives and manages the image group attribute information based on images managed in the image management unit 302 and the attribute information of the images obtained by the image attribute obtainment unit 315. Description regarding a derivation/management method of image group attribute information by the image group attribute management unit 313 is given using FIGS. 5A and 5B.

The difference derivation unit 314 uses two pieces of image group attribute information derived by the image group attribute management unit 313 to derive a difference between the two pieces of image group attribute information. The determination unit 312 determines whether to recommend a candidate item in accordance with the difference derived by the difference derivation unit 314. Specifically, the determination unit 312 performs item deciding processing for deciding an item to be recommended to the user in accordance with the difference derived by the difference derivation unit 314. Description regarding a method of determining whether to recommend a candidate item according to the determination unit 312 is given using FIG. 7.

Note, the system configuration and the functional configuration of the present embodiment are only one example, and an image management server having a function of the image management unit 302 may be added to the system, or a recommendation terminal having a function of the recommendation unit 303 may be added to the system.

Next, description regarding a management method of an attribute type by the item attribute management unit 311 is given with reference to FIG. 4. FIG. 4 illustrates one example of an item attribute information management table 400 that is used for managing attribute types. The item attribute information management table 400 is configured from an ID 410, an item type 420, and an attribute type 430, and each row indicates the attribute information of one item. Note, as one example, it is assumed that the item attribute information management table 400 is obtained via the network 103 from the management server 101. Also, the item attribute information management table 400 may be consecutively updated via the network 103 from the management server 101 whenever an addition of a new item or a deletion of an unneeded item occurs.

The ID 410 is an ID for specifying the respective item type 420. The item type 420 is information which represents an item. Although a product name is used as the item type 420 in the example of FIG. 4, anything may be used as long as it is information that can be linked to a candidate item such as a product code. The attribute type 430 is information which represents an attribute relating to a corresponding item. In the example of FIG. 4, although an object distance that is ideal for a lens is used as an item in the present embodiment, one or more arbitrary attribute types according to each item may be used as the attribute type 430.

Next, description regarding a management method of image group attribute information by the image group attribute management unit 313 is given with reference to FIGS. 5A and 5B. FIGS. 5A and 5B illustrate one example of image group attribute information management tables 500 (FIG. 5A) and 550 (FIG. 5B) used for managing image group attribute information. Each row of the image group attribute information management tables 500 and 550 indicates one type of image group attribute information. FIG. 5A illustrates an image group attribute information management table for images captured in a latest predetermined time period (within one month for example) from a current date/time (a timing at which a recommended item is to be decided, for example). Also, FIG. 5B illustrates an image group attribute information management table for images captured in a time period outside the latest predetermined time period (before one month for example) from the current date/time.

An ID 510 is an ID for specifying an image group having the same attribute type 520 in the image group attribute information management table 500 of FIG. 5A. The attribute type 520 corresponds to the attribute type 430 in FIG. 4. A capture count ratio 530 is a ratio of a count of images having the same attribute type 520 in an image group captured in a latest predetermined time period from the current date/time.

Here, description is given regarding a method for deriving the image group attribute information by the image group attribute management unit 313. Firstly, the image group attribute management unit 313 obtains from the image attribute obtainment unit 315 attribute information (including information of an object distance in the present embodiment) of images captured in the latest predetermined time period (within one month, for example) from the current date/time from among images managed in the image management unit 302. After this, the image group attribute management unit 313 derives a ratio of a count of images for each attribute type of the image groups captured in the predetermined time period. Specifically, firstly, the image attribute obtainment unit 315 obtains the attribute information of each image including a capturing date/time in the predetermined time period and passes it to the image group attribute management unit 313. The image group attribute management unit 313 extracts an object distance from the attribute information received from the image attribute obtainment unit 315 and classifies the extracted object distance as one attribute type 520. A number of images belonging to each attribute type 520 is calculated after classification of all of the attribute information received from the image attribute obtainment unit 315 finishes. Moreover, the image group attribute management unit 313 derives the capture count ratio 530 for each attribute type 520 by dividing the number of images of each attribute type 520 by the total number of images captured in the predetermined time period. The image group attribute management unit 313 generates the image group attribute information management table 500 from the image group attribute information derived in this way and manages image attribute information thereby.

Also, an image group attribute information management table 550 of FIG. 5B is generated by a method similar to the method described above for images captured in a time period outside the latest predetermined time period from the current date/time. An ID 560, an attribute type 570, and a capture count ratio 580 have the same meaning as the ID 510, the attribute type 520, and the capture count ratio 530 of FIG. 5A.

Figure 6:
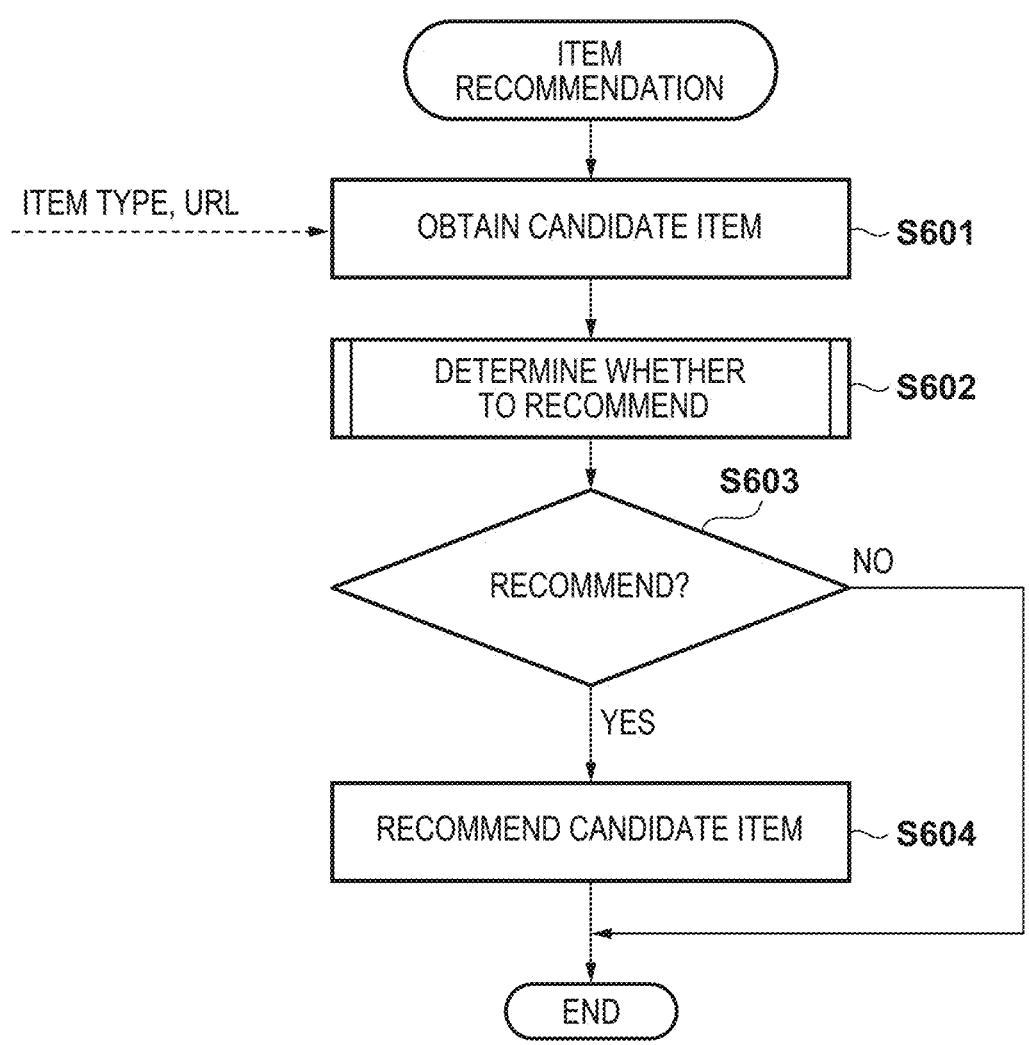
FIG. 6 is a flowchart illustrating an example of processing for recommending candidate items according to the first embodiment.
Figure 13:
FIG. 13 is a conceptual diagram illustrating an example of a display recommending an item according to the first embodiment.

Next, a description regarding processing for determining whether to recommend a candidate item by the image managing apparatus 102 in the present embodiment is given. FIG. 6 is a flowchart illustrating an operation for recommending candidate items the present embodiment. Also, FIG. 13 illustrates one example of a screen 1300 in the present embodiment displayed on a display as an output unit 207 by the recommendation unit 303.

In step S601, the candidate item information obtainment unit 301 obtains information of a candidate item from the management server 101. Specifically, the candidate item information obtainment unit 301 obtains an item type of a candidate item and item recommendation information (URL of a Web page on which information of the candidate item is described, for example). In addition to a URL of a Web page, the item recommendation information may be text recommending the candidate item, an image, or XML data that includes a link to a Web page through which a candidate item can be purchased. In step S602, the recommendation determination unit 310 determines whether to recommend the candidate item in accordance with the item type of the candidate item being inputted. Description is given later regarding the processing of step S602 using FIG. 7. In step S603, the recommendation determination unit 310 determines whether to recommend the candidate item as a result of the processing of step S602. The processing is advanced to step S604 in a case when the candidate item is to be recommended (Yes in step S603). In step S604, the recommendation unit 303 using the output unit 207 to present item recommendation information of a candidate item obtained in step S601 to the user to perform a recommendation of the candidate item. In a case when a candidate item is not to be recommended (No in step S603), the recommendation unit 303 does not recommend the candidate item and the processing finishes.

Note, as one example, the image managing apparatus 102 can perform processing of determining whether to recommend the present candidate item when a new image is saved to the image management unit 302 or a notification of a registration of a new candidate item is made from the management server 101. Also, the item recommendation information obtained in step S601 may include a discount coupon for a time of a recommendation candidate item purchase, a program for generating recommendation information according to image capturing tendencies obtained from images stored in the image management unit 302, or the like. In a case when this program is executed by the recommendation unit 303 and images whose object distance is short are captured more than previously, for example, recommendation text relating to a captured image whose object distance is short, as illustrated in an area 1301 in the screen 1300 of FIG. 13, can be generated.

Figure 7:
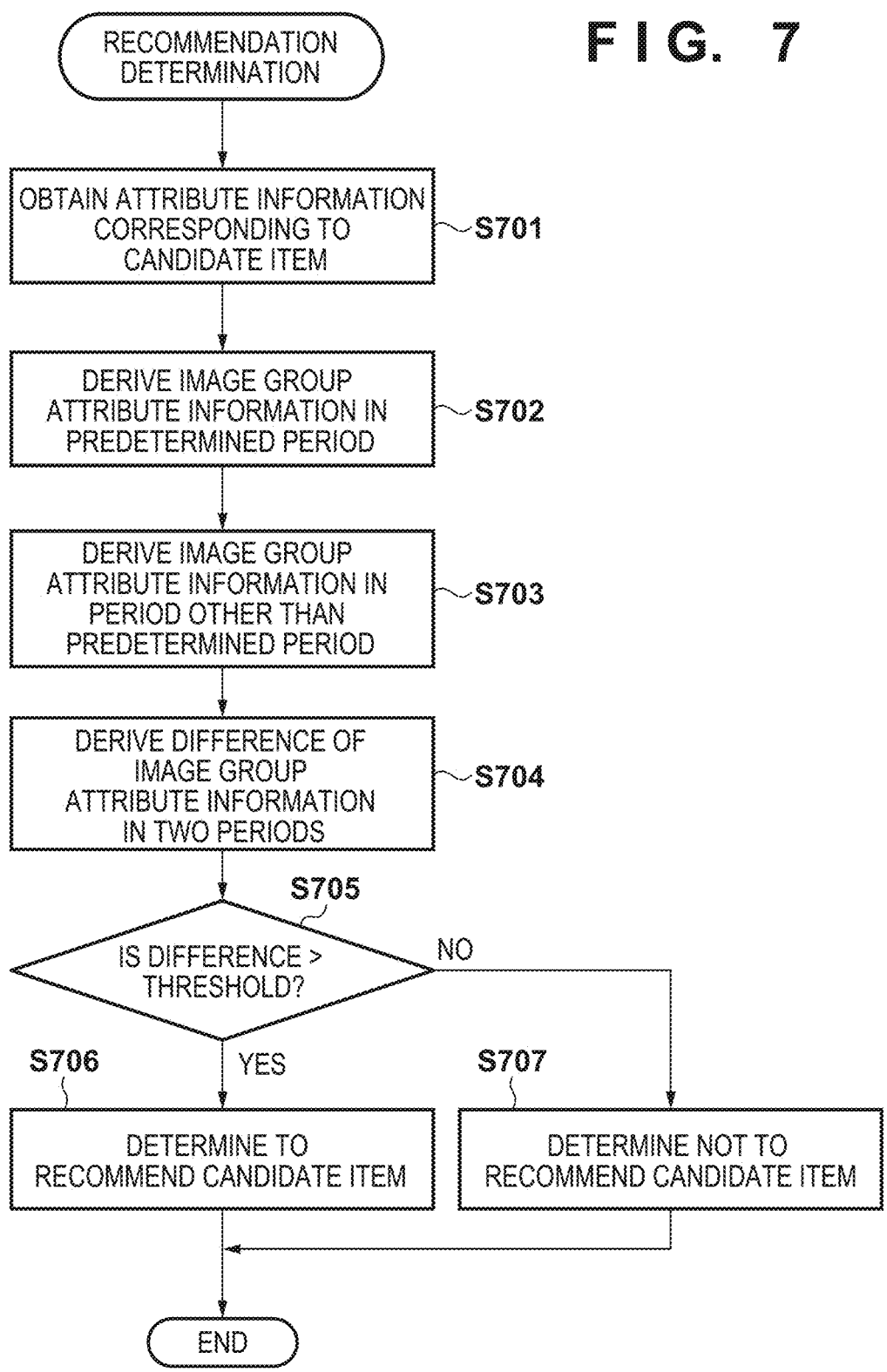
FIG. 7 is a flowchart illustrating an example of processing for determining whether to recommend an item, in the first embodiment.

FIG. 7 is a sub flow of the processing of step S602 of FIG. 6 and is a flowchart illustrating an operation in which the determination unit 312 of the recommendation determination unit 310 in the present embodiment determines whether to recommend a candidate item.

In step S701, the determination unit 312 obtains from the item attribute information management table 400 (FIG. 4) attribute information (the attribute type 430 in the present embodiment) corresponding to the item type of the candidate item obtained by the candidate item information obtainment unit 301 in step S601.

In step S702, the image group attribute management unit 313 derives image group attribute information for an image captured in the latest predetermined time period (within one month for example) from a current date/time. Here, the derived image group attribute information is as described with reference to FIG. 5A. The derived image group attribute information is passed to the determination unit 312.

Next, in step S703, the image group attribute management unit 313 derives image group attribute information for an image captured in a time period other than the latest predetermined time period (within one month for example) from a current date/time. Here, the derived image group attribute information is as described with reference to FIG. 5B. The derived image group attribute information is passed to the determination unit 312.

Next, the difference derivation unit 314 accepts image group attribute information via the determination unit 312 and derives a difference of the image group attribute information between the two time periods (the predetermined time period and of the time period outside the predetermined time period) in step S704. In the present embodiment, the difference derivation unit 314 compares capture count ratios of the same attribute type as the candidate item in the image groups captured in the two time periods. Specifically, the difference derivation unit 314 compares the capture count ratio 530 of FIG. 5A and the capture count ratio 580 of FIG. 5B for the attribute type that is the same as the candidate item. In the present embodiment, the difference derivation unit 314 derives the difference between the two capture count ratios and passes the difference to the determination unit 312 as a comparison result.

In step S705, the determination unit 312 determines whether or not the value of the difference received from the difference derivation unit 314 exceeds a predetermined threshold. The processing is advanced to step S706 if the difference exceeds the predetermined threshold (Yes in step S705). In step S706, the determination unit 312 determines to recommend the candidate item. Meanwhile, the determination unit 312 determines not to recommend the candidate item (step S707) if the difference does not exceed the predetermined threshold (No in step S705), and the processing finishes.

A case in which the item type of the candidate item is "EF100 mm F2.8L Macro IS USM" is considered as one example. In such a case, the determination unit 312 obtains the attribute information (attribute type 430=object distance 0-50 cm) corresponding to the item type from the item attribute information management table 400 in step S701. After this, the capture count ratio 530=0.78 corresponding to the attribute type 520=object distance 0-50 cm from among the latest image group of one month is derived, as in FIG. 5A, by the image group attribute management unit 313 in step S702. Also, the capture count ratio 580=0.03 corresponding to the attribute type 570=object distance 0-50 cm from among the image group outside of the latest one month is derived, as in FIG. 5B, by the image group attribute management unit 313 in step S703. Then, the difference derivation unit 314 derives the difference of the two ratios as 0.78−0.03=0.75 in step S704. The determination unit 312 determines to recommend "EF100 mm F2.8L Macro IS USM", which is the recommended item, in step S705 because the difference derived in step S704 exceeds the predetermined threshold (0.3 for example) (Yes in step S704).

Note, depending on the candidate item there are things that cover a plurality of attribute types such as zoom lenses with a wide focal length range and the like. In such a case, the recommendation determination unit 310 may perform the processing of step S704 through step S707 for each of the plurality of assigned attribute types as described above in relation to one recommended item.

The screen 1300 in the present embodiment that is displayed on the display which is the output unit 207 by the recommendation unit 303 in step S604 in a case when recommending is determined in step S603 of FIG. 6 (Yes in step S603) is illustrated in FIG. 13. A recommendation text generated by a program is illustrated in the area 1301 within the screen 1300 as the item recommendation information obtained in step S601 as described above. Note, the item recommendation information may be different in a case when the attribute is different even if it is the same item. Note, although the item recommendation information is obtained from the management server 101, it may be obtained by another means in the present embodiment.

As described above, in the present embodiment, it is determined whether or not there is a change (difference) for an image capturing tendency for the image group captured in the latest predetermined time period (time range) before the current date/time from the image capturing tendency for the image group captured outside the latest time period. Then, in a case when this change (difference) exceeds the predetermined threshold, an item according to the most recent image capturing tendency is recommended to the user. By this, it becomes possible to recommend a purchase of an item according to a new image capturing tendency when there is a change in the capturing tendency of the user. Also, it becomes possible to better perk the eagerness of the user to buy the item by presenting a suitable recommendation text according to the most recent capturing tendencies of the user.

Note, although in the present embodiment the recommendation determination unit 310 performs a determination of whether to recommend the recommendation candidate item based on one piece of attribute information, it may also perform determination of whether to recommend based on differences of a plurality of pieces of attribute information. Also, in the present embodiment, the image group attribute management unit 313 is performing processing for deriving attribute information of an image group in the process for determining whether to recommend an item (FIG. 7), but this may be performed when a new image group is saved, or periodically. Also, in the present embodiment, the determination unit 312 performs a determination of whether to recommend based on a ratio of attribute information corresponding to a recommendation candidate item in a captured image group, but it may perform a determination of whether to recommend based on whether there is an average value, a distribution, a particular value of attribute information of an image in a captured image group. Also, the attribute information may be a numerical value and may be level information, and a numerical value may use a normalized value. Also, while the predetermined period was made to be within one month from the execution of the processing in the present embodiment, another value may be used, and the latest N capture opportunities (for example, capture dates) rather than a time period may also be used. Also, the present embodiment configuration is taken to generate the image group attribute information management tables 500 and 550 in the processing of step S702 and step S703 of FIG. 7, but not all of the tables are necessarily generated. For example, configuration may be taken to generate only the attribute information for which the recommendation candidate item and the attribute type match.

Second Embodiment

In the first embodiment, to determine whether to recommend each candidate item, it is necessary to obtain the attribute information of each image, and derive as many pieces of attribute information of image groups captured in a latest time period and other time periods as there are candidate items. Accordingly, there is a concern that the same process will be performed a number of times and the processing time will become large if there is a desire to recommend a suitable item to a user for which there is no particular candidate item and there are a large number of candidate items. Also, the same item will end up being recommended to the user a number of times if recommendation is performed based on the difference in attribute information of the image group captured in the latest time period and the image group captured outside of the latest time period, and that difference exceeds a threshold as in the first embodiment.

In the present embodiment, to handle these problems, a candidate item is selected within the image managing apparatus 102 and it is determined whether to recommend the item based on previous recommendations. Differences from the first embodiment will be described below.

Figure 8:
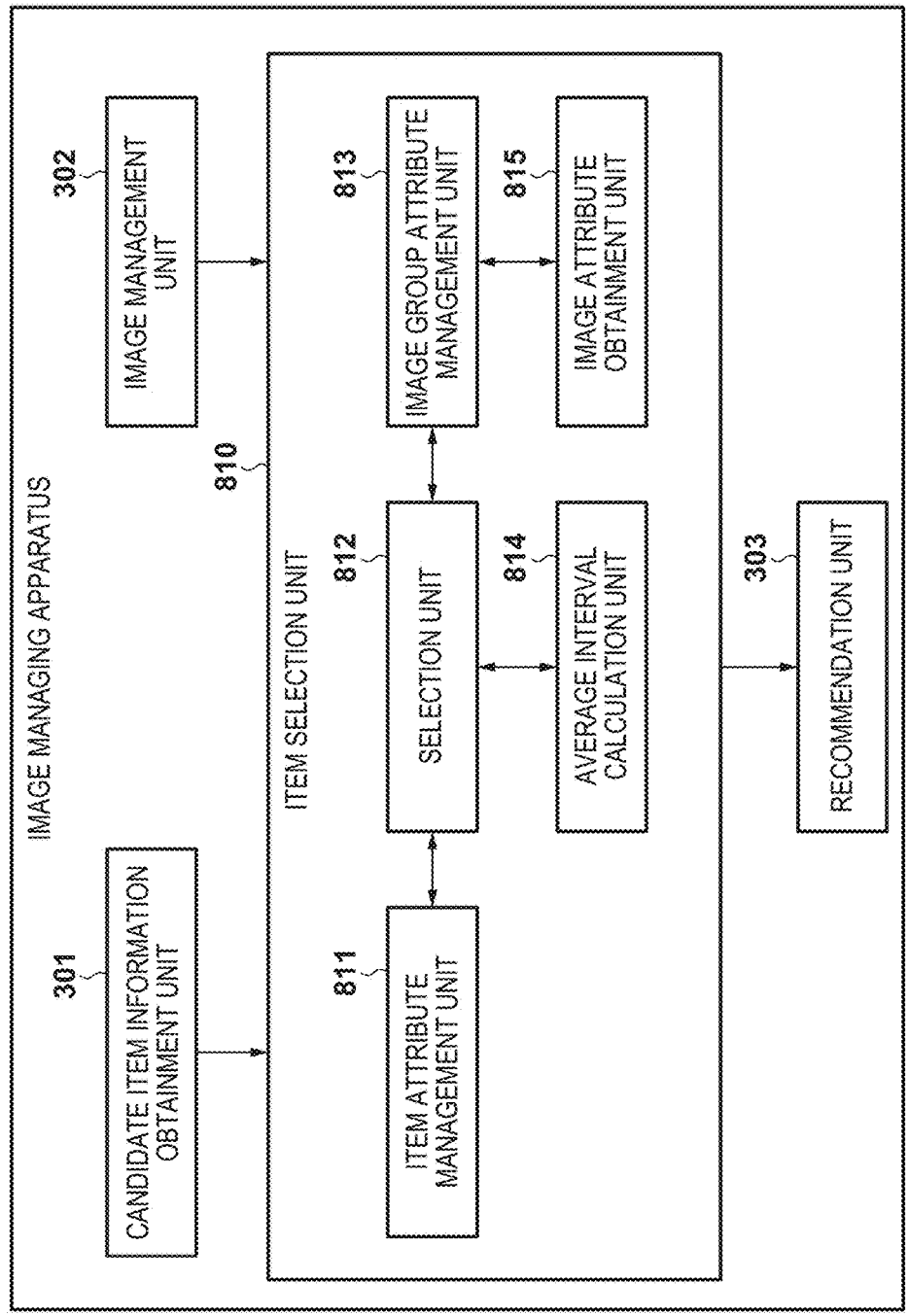
FIG. 8 illustrates an example of a functional configuration of the image managing apparatus in a second embodiment.

FIG. 8 illustrates an example of a functional configuration of the image managing apparatus 102 in the present embodiment. The image managing apparatus 102 in the present embodiment as compared to the image managing apparatus 102 of FIG. 3 described in the first embodiment differs in that the recommendation determination unit 310 is replaced with a recommendation item selection unit 810. The recommendation item selection unit 810 has an item attribute management unit 811, a selection unit 812, an image group attribute management unit 813, an average interval calculation unit 814, and an image attribute obtainment unit 815.

The item attribute management unit 811 manages an attribute type corresponding to an item type by an item attribute information management table. A method of managing attribute types by the item attribute management unit 811 is described later using FIG. 9.

The image attribute obtainment unit 815 obtains an image from the image management unit 302 and uses metadata such as Exif attached to the image or a result obtained by analyzing the image to obtain attribute information of the image. The image group attribute management unit 813 derives and manages the image group attribute information based on images managed in the image management unit 302 and the attribute information of the images obtained by the image attribute obtainment unit 315. A main object and a capturing date/time (an initial date/time and a final date/time) for each image group are included in the image group attribute information. A derivation/management method of image group attribute information by the image group attribute management unit 313 is described later using FIG. 10.

The average interval calculation unit 814 calculates an average time interval between capture opportunities having the most frequent main object out of the latest N capture opportunities based on image group attribute information derived by the image group attribute management unit 813. Also, the average interval calculation unit 814 calculates the average time interval between capture opportunities having the most frequent main object out of capture opportunities other than the latest N capture opportunities. The method of calculation of the average time interval by the average interval calculation unit 814 is described later using FIG. 10.

The selection unit 812 selects the item to recommend from the item attribute information management table 400 in accordance with the flowchart of FIG. 11 described later.

Next, description regarding a management method of an attribute type by the item attribute management unit 811 is given with reference to FIG. 9. FIG. 9 illustrates one example of an item attribute information management table 900 that is used for managing attribute types. The item attribute information management table 900 is configured from an ID 910, an item type 920, an attribute type 930, and a last recommended date 940, and each row indicates one piece of candidate item information. Note, as one example, it is assumed that the item attribute information management table 400 is obtained via the network 103 from the management server 101. Also, the item attribute information management table 400 may be consecutively updated via the network 103 from the management server 101 whenever an addition of a new item or a deletion of an unneeded item occurs.

The ID 910 is an ID for specifying the respective item type 920. The item type 920 is information which represents an item. Although a product name is used as the item type 920 in the example of FIG. 9, anything may be used as long as it is information that can be linked to a recommendation candidate item such as a product code. The attribute type 930 is information which represents an attribute relating to a corresponding item. In the example of FIG. 9, although an object that is ideal for a lens is used as an item in the present embodiment, one or more arbitrary attribute types according to each item may be used as the attribute type 930. The last recommended date 940 represents information of the last day a corresponding item was recommended to a user. In FIG. 9, the last recommended date 940 being "-" represents that the corresponding item has not been recommended to the user thus far.

Next, description regarding a management method of image group attribute information by the image group attribute management unit 313 is given with reference to FIG. 10. FIG. 10 illustrates one example of an image group attribute information management table 1000 that is used for managing the image group attribute information. Each row of the image group attribute information management table 1000 represents attribute information of an image group of one capture opportunity (a capture date in the present embodiment).

An ID 1010 is an ID for specifying a group of images having the same capture opportunity in the image group attribute information management table 1000. A main object 1020 represents a main object in an image group of a corresponding ID. In the example of FIG. 10, the main object 1020 is "person" or "landscape", but a more finely/roughly selected object may be used. A first image capturing date/time 1030 represents a capturing date/time of a first image in an image group of a corresponding ID. A final image capturing date/time 1040 represents a capturing date/time of a final image in an image group of a corresponding ID.

Here, description is given regarding a method for deriving the image group attribute information by the image group attribute management unit 813. Firstly, the image attribute obtainment unit 815 obtains an image from the image management unit 302, attribute information (in the present embodiment, information related to a captured scene or an object and information of the capturing date/time are included) of each image is obtained and passed to the image group attribute management unit 813. The image group attribute management unit 813 extracts a main object and a capturing date/time from the attribute information received from the image attribute obtainment unit 815. Note that the image group attribute management unit 813 may extract (specify) the main object for each image based on the result of image processing performed by the image attribute obtainment unit 815. After that, the image group attribute management unit 813 decides the most frequent object among the objects of the images captured on the same capture opportunity (capture date in the present embodiment) as the main object 1020. Also, the image group attribute management unit 813 makes images captured on the same capture opportunity one image group and specifies the first image capturing date/time 1030 and the final image capturing date/time 1040 thereof. The image group attribute management unit 813 derives image group attribute information by the same method as this for a plurality of capture opportunities. The image group attribute management unit 813 generates the image group attribute information management table 1000 from the image group attribute information derived in this way and manages image attribute information thereby.

Next, a method of calculation of the average time interval by the average interval calculation unit 814 will be described. The average interval calculation unit 814, using the image group attribute management table of FIG. 10, calculates an average time interval in time ranges of capture opportunities having the most frequent main object (the main object that is most frequently the target of capturing) out of the N latest capture opportunities. In the example of FIG. 10, when N is made to be 5, the average interval calculation unit 814 first specifies the most frequent main object from the main object 1020 where the ID 1011=1001-1005. In the example of FIG. 10, the most frequent main object is specified as "person". Next, the average interval calculation unit 814 calculates the time interval between capture opportunities of the image groups where the main object 1020=person. In the example of FIG. 10, the average interval calculation unit 814 calculates a difference between the first image capturing date/time 1030=2015/09/19 18:12 whose ID 1010=1001 and the final image capturing date/time 1040=2015/09/19 18:56 whose ID=1002. The average interval calculation unit 814 further calculates respective differences between the first image capturing date/time 1030 whose ID=1002 to 1004 and the final image capturing date/time 1040 whose ID=1003 to 1005. After this, the average interval calculation unit 814 calculates the average of all the calculated differences as an average time interval.

Next, a description regarding processing for determining whether to recommend a candidate item by the image managing apparatus 102 in the present embodiment is given. FIG. 11 is a flowchart illustrating an operation for recommending candidate items the present embodiment. FIG. 11 changes the operational flow that makes the recommendation of the item of FIG. 6 to use the recommendation item selection unit 810.

In step S1101, the selection unit 812 selects the item that should be recommended based on information of the image stored in the image management unit 302 or decides that there is no item that should be recommended. Next, in step S1102, the selection unit 812 determines whether or not the item to be recommended is selected in step S1101. If no item to be recommended is selected, the processing ends (No in step S1102). If an item to be recommended is selected, the processing advances to step S1103 (Yes in step S1102).

In step S1103, the selection unit 812 sets the item selected first out of the selected items as an item of interest. Next, in step S1104, the selection unit 812, based on the last recommended date 940 of the item, determines whether or not the item of interest set in step S1103 has been recommended to the user within a predetermined time period. If the item of interest has been recommended to the user within the predetermined time period (Yes in step S1104), the processing advances to step S1108. If the item of interest has not been recommended to the user within the predetermined time period (Yes in step S1104), the processing advances to step S1105.

As an example, assume that in step S1101, the item of the ID 910=902 of FIG. 9 is selected. The last recommended date 940="-" for the ID 901, and so that item has not been recommended to the user thus far. Accordingly, in such a case, the determination is No in step S1104, and the processing advances to step S1105.

Returning to FIG. 11, in step S1105, the selection unit 812 obtains the item recommendation information (XML data) of the item of interest via the network 103 from the management server 101. Also, in step S1106, the recommendation unit 303 makes a recommendation of the item of interest by presenting item recommendation information to the user using the output unit 207 or the like. In step S1107, the item attribute management unit 811 updates the information of the last recommended date 940 (FIG. 9) of the item of interest (recommended item). Next, in step S1108, the selection unit 812 determines whether there are still other items selected in step S1101. If there is no selected item (No in step S1108), the processing ends. If this still is a selected item, the selection unit 812 sets the next selected item (an item for which step S1104 through step S1107 have yet to be performed) out of the items selected in step S1101 as the item of interest. After that, the processing from step S1104 is performed.

Note, as one example, the image managing apparatus 102 can perform item recommendation processing when a new image is saved to the image management unit 302 or a notification of a registration of a new candidate item is made from the management server 101. Also, the item recommendation information obtained from the management server may include a discount coupon for a time of a recommendation candidate item purchase, a program for generating recommendation information according to image capturing tendencies obtained from images stored in the image management unit 302, or the like. In a case when this program is executed by the recommendation unit 303 and images that capture a person as a main object more than previously, for example, recommendation text relating to a captured image whose main object is a person, as illustrated in an area 1401 in a screen 1400 of FIG. 14, can be generated. Also, the item recommendation information is made to be XML data in the present embodiment, but it may be a URL of a Web page that recommends an item, similarly to the first embodiment.

Figure 11:
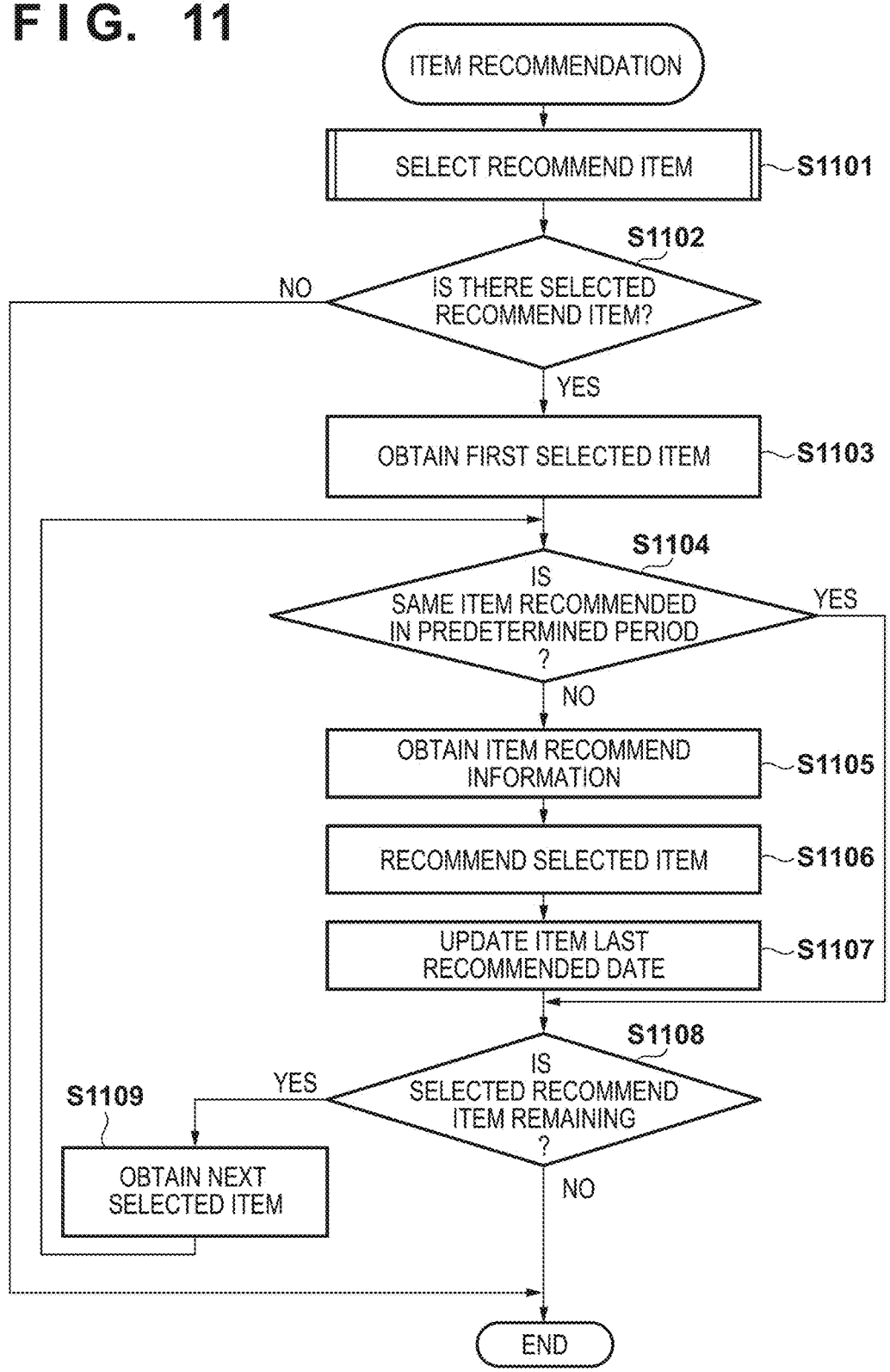
FIG. 11 is a flowchart illustrating an example of processing for recommending candidate items according to the second embodiment.
Figure 12:
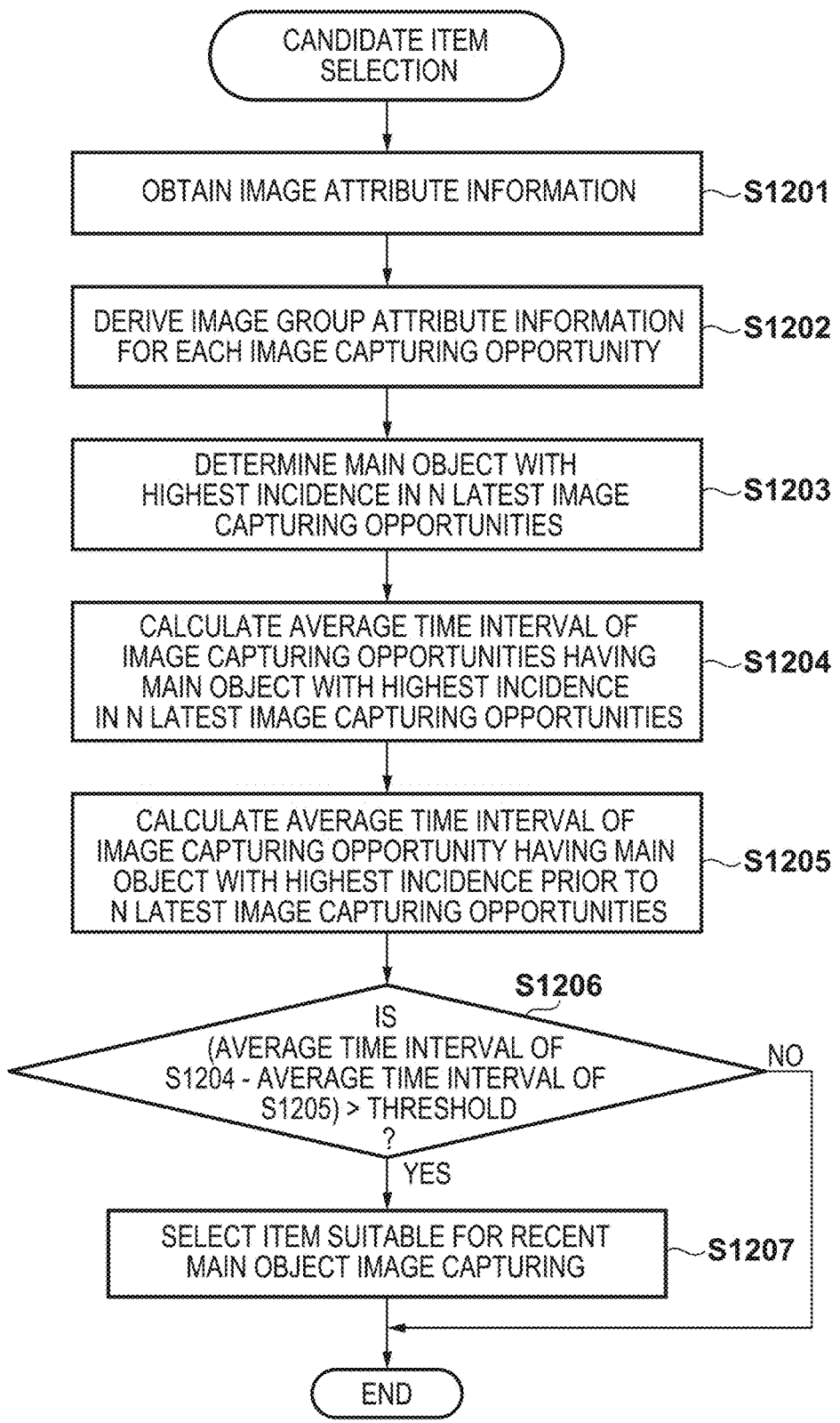
FIG. 12 is a flowchart illustrating an example of processing for an item selection according to the second embodiment.

FIG. 12 is a sub flow of step S1101 of FIG. 11, and is a flowchart that illustrates an operation for the selection unit 812 for selecting a recommended item. FIG. 12 changes the operational flow for determining whether to recommend FIG. 7 so as to select the recommended item.

In step S1201, the image attribute obtainment unit 815 analyzes an image stored in the image management unit 302, and obtains attribute information from a result of extracting metadata of an Exif or the like. In the present embodiment, it is assumed that information related to a captured scene or an object and information of a capturing date/time are included in the attribute information. Next, in step S1202, the image group attribute management unit 813 accepts attribute information of the image from the image attribute obtainment unit 815, and derives image group attribute information (FIG. 10) for each capture opportunity (capture date in the present embodiment). The derived image group attribute information is passed to the selection unit 812.

Next, in step S1203, the average interval calculation unit 814 accepts image group attribute information via the selection unit 812, and determines the most frequent main object in the group of images of the N latest capture opportunities. N is 5 in the example of FIG. 10, and because the main object 1020 is a person for all of the 5 latest capture opportunities, the most frequent main object is determined to be person.

In step S1204, the average interval calculation unit 814 calculates the average time interval between capture opportunities that have the most frequent main object determined in step S1203 in the N latest capture opportunities. Specifically, the average interval calculation unit 814 further calculates respective differences between the first image capturing date/time 1030 whose ID=1001 to 1004 and the final image capturing date/time 1040 whose ID=1002 to 1005, and calculates the average of all of the calculated differences as the average time interval. In the example of FIG. 10, the average interval calculation unit 814 calculates the average time interval of the latest N times to be 22 hours and 28 minutes.

In step S1205, the average interval calculation unit 814 calculates the average time interval between capture opportunities that have the most frequent main object determined in step S1203 in capture opportunities prior to the N latest capture opportunities. Specifically, the average interval calculation unit 814 calculates a difference between the first image capturing date/time 1030 whose ID=1007 and the final image capturing date/time 1040 whose ID=1008, and the difference between the first image capturing date/time 1030 whose ID=1008 and the final image capturing date/time 1040 in the prior capture opportunities (not shown) whose main object is a person. In the example of FIG. 10, the average interval calculation unit 814 calculates the average time interval of the capture opportunities prior to the latest N times to be 128 days and 7.5 minutes.

Next, in step S1206, the selection unit 812 calculates the difference between the average times calculated in step S1204 and step S1205 respectively, and determines whether or not the difference is larger than a threshold. In the present embodiment, the threshold is made to be three days. Accordingly, in step S1206, the selection unit 812 calculates the difference between 22 hours and 28 minutes and 128 days and 7.5 minutes, and determines that the difference is larger than the threshold (Yes in step S1206). In such a case, the processing advances to step S1207, and an item suitable for capturing the main object determined in step S1204 is selected. In the present embodiment, the item type 920="EF185 mm F1.8USM" whose ID 910=902 corresponding to attribute type 930=person is selected as an item suitable to capturing a person from FIG. 9. Meanwhile, if the difference is not larger than the threshold in step S1206 (No in step S1206), the selection unit 812 decides that there is no item that should be recommended. After that, the processing ends.

Also, the screen 1400 in the present embodiment, which is displayed on a display as the output unit 207 by the recommendation unit 303 in step S1106 of FIG. 11, is illustrated in FIG. 14. A recommendation text generated by a program is illustrated in the area 1401 within the screen 1400 as the item recommendation information as described above. Note, the item recommendation information may be different in a case when the attribute is different even if it is the same item.

As explained above, in the present embodiment, if the main object of the image group captured in the latest plurality of capture opportunities from the current date/time is more numerous than the main object of the image group captured in other capture opportunities, it is decided that an item suitable for the main object be recommended. By this, it becomes possible to recommend a purchase of an item according to a new image capturing tendency when there is a change in the capturing tendency of the user.

Note that while in the present embodiment the main object is determined from the metadata attached to the image, a method of determining the object from a known image analysis result may be used for the determination of the main object of the image. Also, the determination may use a conventional method for determining a captured scene from a result of known face detection, object distance, brightness, tint, and movement information. Also, while the recommendation candidate item is selected using only information of the main object in the present embodiment, configuration may be taken to only make an item selected according to a fixed number of pieces of information or more among recommendation candidate items selected according to a plurality of pieces of information be the recommendation candidate. Also, all of the recommendation candidate items selected by the plurality of pieces of information may be made to be recommendation candidates. Also, while image group attribute information is generated for each capture opportunity in step S1202, confirmation may be taking to perform grouping based on other criteria, and to generate image group attribute information for each group.

Variations

While in the first and second embodiments, the item recommendation processing is executed when a new image is saved or a new recommendation candidate item registration is notified, it may be executed at another timing such as executing it periodically in predetermined intervals. Also, while two image group attribute information management tables were generated in the foregoing embodiments, configuration may be taken to generate even more image group attribute information management tables.

Third Embodiment

Description is given as the third embodiment of an item recommendation system for determining whether to recommend to a user a recommendation candidate item (hereinafter referred to as a candidate item) that is a candidate to be recommended and for deciding that the candidate item will be recommended to the user in a case when the item is determined to be recommended. Note, although "item" in the description hereinafter is a lens, it may be anything as long as it is an item relating to an image or image capturing such as image capturing equipment such as a camera body or a tripod, a printer, or an image editing application. In addition, camera bags, apparel, travel, travel related products, sports related products, and the like may be handled as recommended items if they can be associated with image information.

The example of a configuration of the item recommendation system 100 in the present embodiment is the same as FIG. 1. Also, the example of a hardware configuration of the image managing apparatus 102 in the present embodiment is the same as FIG. 2.

Figure 15:
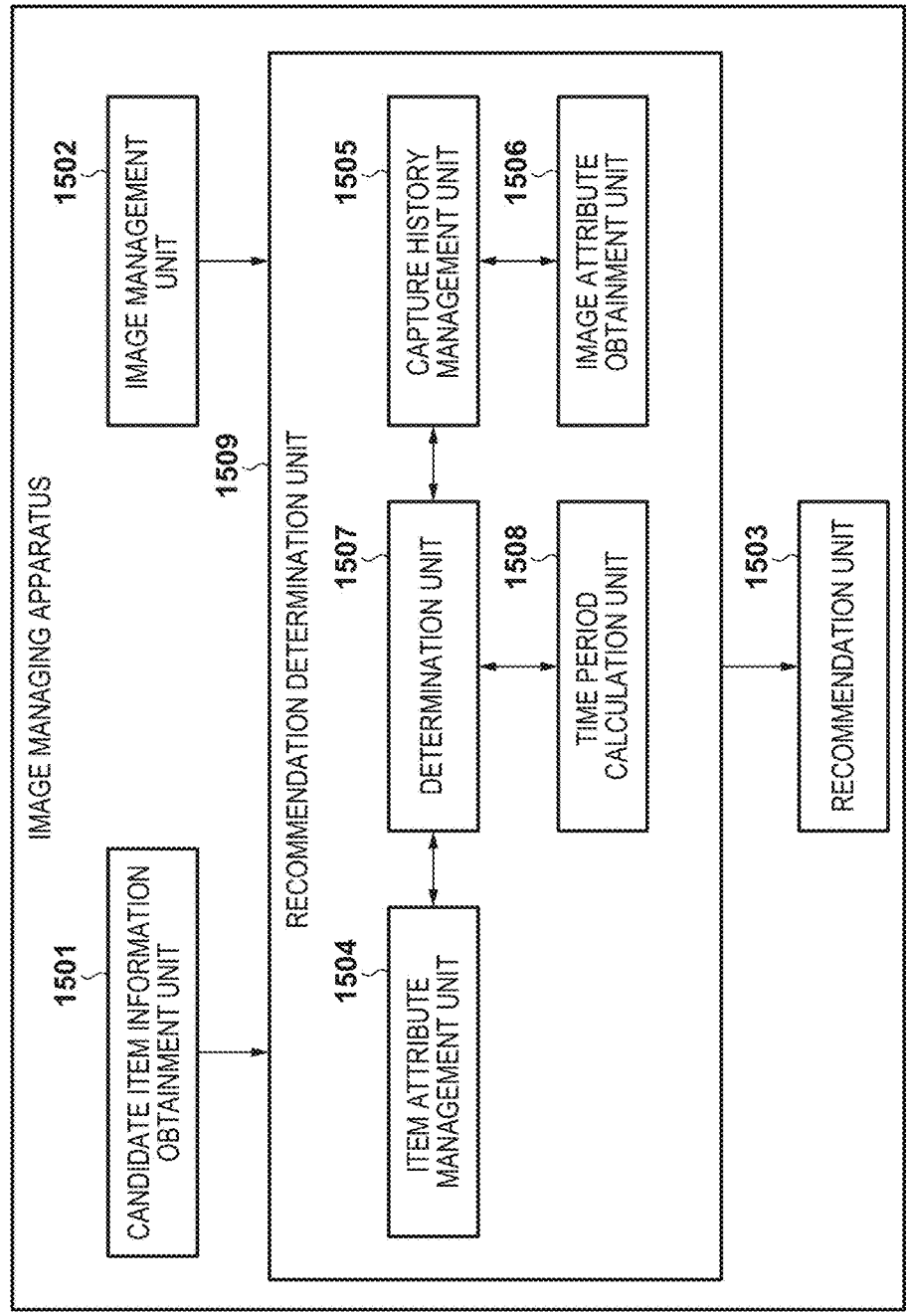
FIG. 15 illustrates an example of a functional configuration of the image managing apparatus in a third embodiment.

FIG. 15 illustrates an example of a functional configuration of the image managing apparatus 102 in the present embodiment. The image managing apparatus 102 is configured from a candidate item information obtainment unit 1501, an image management unit 1502, a recommendation determination unit 1509, and a recommendation unit 1503 as a functional configuration.

The candidate item information obtainment unit 1501 obtains information of a candidate item from the management server 101. The image management unit 1502 saves and manages images that a user captured in the past. A description regarding the recommendation determination unit 1509 is given later. When it is determined by the recommendation determination unit 1509 that a candidate item is to be recommended, the recommendation unit 1503 recommends the candidate item to the user by displaying information of the candidate item to the display which is the output unit 207.

Next, description is given regarding the recommendation determination unit 1509. The recommendation determination unit 1509, based on information of a candidate item obtained from the candidate item information obtainment unit 1501 and information of an image obtained from the image management unit 1502, determines whether to recommend the candidate item. An item attribute management unit 1504 manages attribute information (referred to as item attribute information) corresponding to an item type by an item attribute information management table. Description regarding a management method of the item attribute information by the item attribute management unit 1504 is given later using FIG. 16.

An image attribute obtainment unit 1506 obtains an image from the image management unit 1502 and uses metadata of an Exif or the like attached to the image or a result obtained by analyzing the image to obtain attribute information (referred to as image attribute information) of the image. A capture history managing unit 1505 obtains an image from the image management unit 1502, and generates a capture history table based on the image and the attribute information obtained from the image attribute obtainment unit 1506. The capture history managing unit 1505 manages capture history based on the generated capture history table. Description is given later using FIG. 17 of the capture history table generated by the capture history managing unit 1505.

A time period calculation unit 1508 calculates, as a determination time period, a time period (time range) of capture history for use in determination of whether to recommend based on time information such as a current date. Specifically, the time period calculation unit 1508 performs a time range deciding process used to decide an item to recommend to a user. A determination unit 1507 obtains from the capture history managing unit 1505 the number of captures in the determination time period calculated by the time period calculation unit 1508, and determines whether to recommend a candidate item in accordance with attribute information and the number of captures. Specifically, the determination unit 1507 performs an item deciding process for deciding an item to recommend to a user in accordance with the number of times an image having a predetermined attribute is captured in a time range (the determination time period). Description regarding a method of determining whether to recommend a candidate item according to the determination unit 1507 is given later using FIG. 18 and FIG. 19.

Note, the system configuration and the functional configuration of the present embodiment are only one example, and an image management server having a function of the image management unit 1502 may be added to the system, and a recommendation terminal having a function of the recommendation unit 1503 may be added to the system.

Next, description regarding a management method of item attribute information by the item attribute management unit 1504 is given with reference to FIG. 16. FIG. 16 illustrates one example of an item attribute information management table 1600 that is used for managing the item attribute information. The item attribute information management table 1600 is configured from an ID 1601, an item type 1602, a camera type 1603, and a captured scene 1604.

The ID 1601 is an ID for specifying the respective item type 1602. The item type 1602 is information which represents an item. The camera type 1603 is information which represents the type of the camera. The captured scene 1604 is a captured scene that is suited to a corresponding item type (specifically, a type of lens in the present embodiment) and a camera type. In FIG. 16, in the captured scene 1604, one captured scene is set in relation to a corresponding item type and camera type, but a plurality of captured scenes may be set. Note that, as described above, the camera type 1603 and the captured scene 1604 are called item attribute information in the present embodiment.

Note that the item attribute information management table 1600 illustrated in FIG. 16 is only one example, and other information may be included in the item attribute information if it is information that can be associated with an item type. Also, the item attribute information management table 1600 illustrated in FIG. 16 is assumed to be set in advance in the image managing apparatus 102, but configuration may be taken such that it is obtained as appropriate via an external apparatus or medium, or by operation of a user.

Next, description is given with reference to FIG. 17 for the capture history table generated by the capture history managing unit 1505. FIG. 17 is a view illustrating an example of a capture history table 1700. The capture history table 1700 is configured from an ID 1701, a capture date 1702, a camera type 1703, a captured scene 1704, and a number of captures 1705.

The ID 1701 is an ID that specifies each capture event of a capture history. The capture date 1702 is information of a date/time on which capturing was performed. The image attribute obtainment unit 1506 can obtain information of the capture date 1702 by analyzing an image. A camera type 1503 is information representing a type of camera used to perform capturing. The captured scene 1704 is information representing what kind of scene the image was captured in. Note that, as described above, the camera type 1703 and the captured scene 1704 are called image attribute information in the present embodiment. The image attribute obtainment unit 1506 can obtain image attribute information by analyzing an image. In techniques for recognizing a captured scene by an image analysis, a method of using a "bag of visual words" image feature representation is commonly known. The number of captures 1705 is a number of images that hold the same image attribute information on the same capture date. Note that while the number of captures 1705 is made to be the number of captures in one day in the present embodiment, the number of captures in another time period such as one week may also be used. Also, a number of images is used for the number of captures 1705, but a normalized value may also be used. In this way, the capture history table 1700 illustrates a list of capture history representing the number of captures of each piece of image attribute information.

Figure 18:
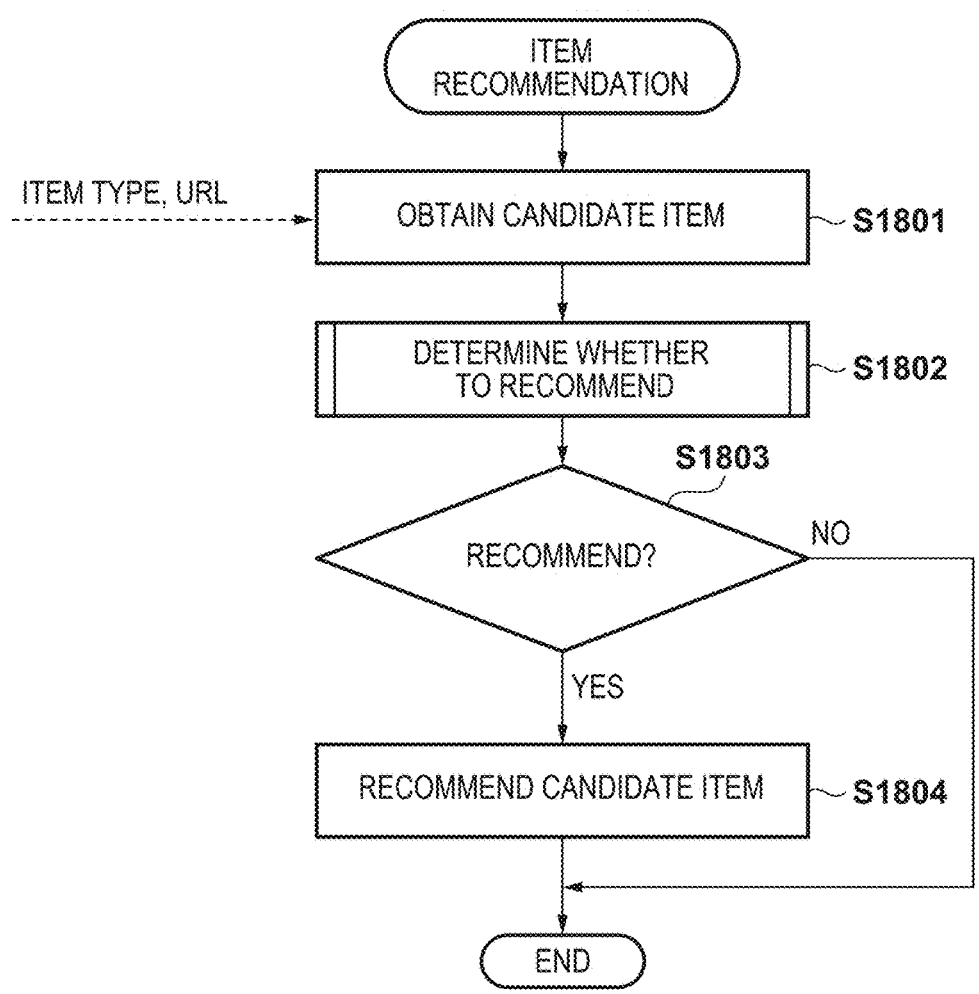
FIG. 18 is a flowchart illustrating an operation for recommending candidate items in the third embodiment.

Next, a description regarding processing for determining whether to recommend a candidate item by the image managing apparatus 102 in the present embodiment is given. FIG. 18 is a flowchart illustrating an operation for recommending candidate items in the present embodiment.

In step S1801, the candidate item information obtainment unit 1501 obtains information of a candidate item from the management server 101. Specifically, the candidate item information obtainment unit 1501 obtains an item type of candidate item and a URL of a Web page on which information of the candidate item is described. Note that while a URL is used in the present embodiment, other information may be used if it is information used to present candidate item information to the user. In step S1802, the recommendation determination unit 1509 determines whether to recommend the candidate item in accordance with the item type of the candidate item being inputted. Description is given later regarding the processing of step S1802 using FIG. 19. In step S1803, the recommendation determination unit 1509 determines whether or not the candidate item is to be recommended as a result of the processing of step S1802. The processing is advanced to step S1804 in a case when the candidate item is to be recommended (Yes in step S1803). In step S1804, the recommendation unit 1503 recommends the candidate item by displaying the Web page of the URL obtained in step S1801 on a display which is the output unit 207. In a case when a candidate item is not to be recommended (No in step S1803), the recommendation unit 1503 does not perform a recommendation of the candidate item and the processing finishes.

The image managing apparatus 102, by repeating the processing from step S1801 to step S1804 periodically, can recommend the candidate item to the user. Note that while a case in which there is one candidate item is illustrated in the present embodiment, the image managing apparatus 102 may repeat the processing from step S1802 to step S1804 for each of the candidate items in cases where they are plural.

Figure 19:
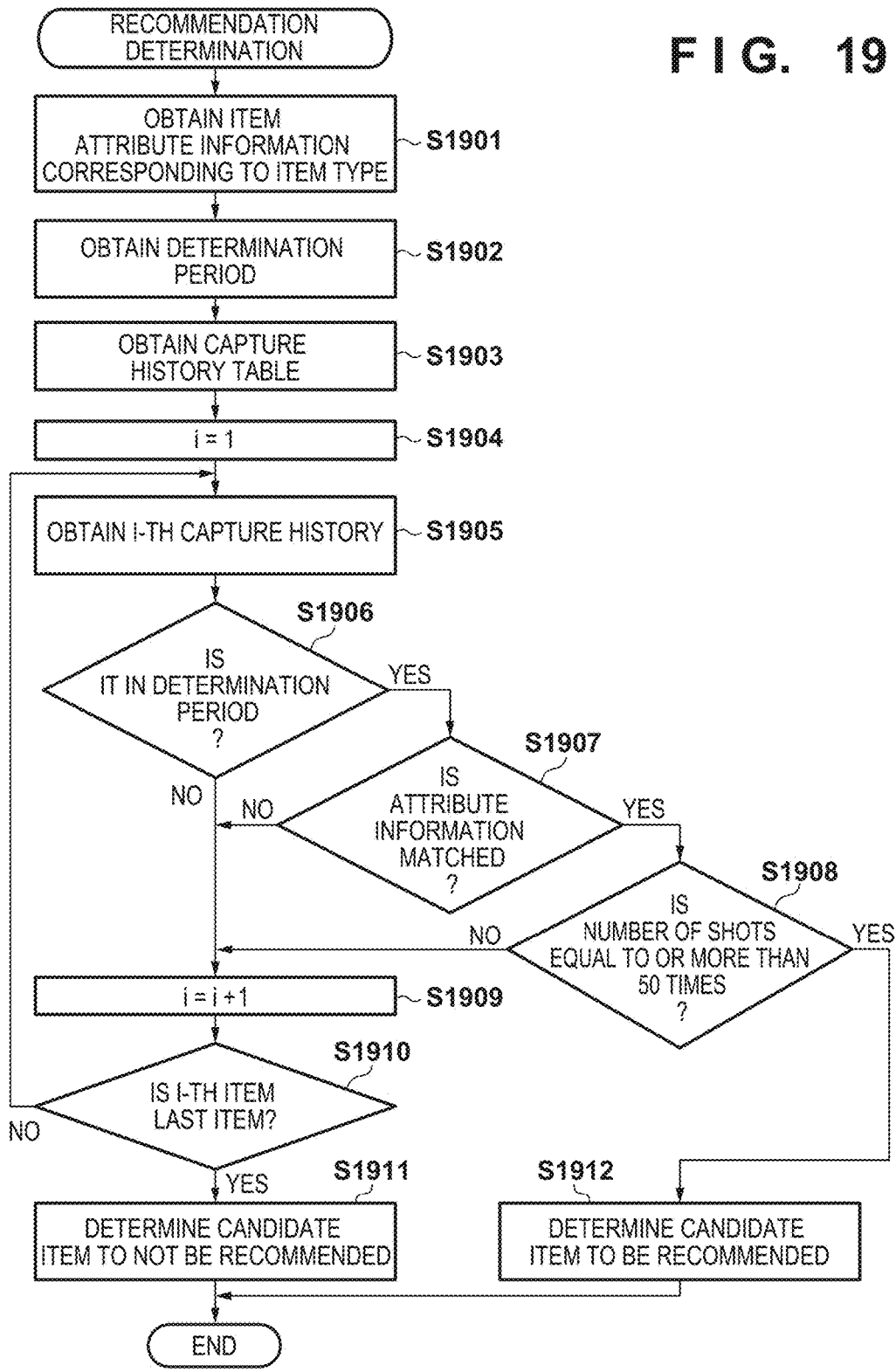
FIG. 19 is a flowchart illustrating an operation for determining whether to recommend a candidate item in the third embodiment.

FIG. 19 is a sub flow of the processing of step S1802 of FIG. 18 and is a flowchart illustrating an operation in which the determination unit 1507 of the recommendation determination unit 1509 in the present embodiment determines whether to recommend a candidate item.

In step S1901, the determination unit 1507 obtains the item attribute information corresponding to the item type of the candidate item obtained by the candidate item information obtainment unit 1501 in step S1801 from the item attribute information management table 1600 (FIG. 16). For example, consider a case in which the item type obtained by the candidate item information obtainment unit 1501 in step S1801 is "telephoto zoom lens". In such a case, the determination unit 1507 obtains from the item attribute information management table 1600 as item attribute information the camera type 1603=single lens reflex camera; the captured scene 1604=sports which corresponds to the ID 1601=3.

In step S1902, the determination unit 1507 obtains a determination time period for use in determining whether to recommend the item which is calculated by the time period calculation unit 1508. Here, the method of calculating the determination time period by the time period calculation unit 1508 is described. The time period calculation unit 1508 calculates the determination time period so as to be a predetermined time period at a predetermined cycle from the current date. In the present embodiment, the predetermined cycle is made to be one year and the predetermined time period is made to be 2 months. For example, if the current date is Aug. 7, 2015, the time period calculation unit 1508 calculates the determination time period to be every year from August 7 to October 7. Note that if the predetermined cycle is made to be half a year and the predetermined time period is made to be one month, the time period calculation unit 1508 calculates the determination time period to be every year from August 7 to September 7 and every year from February 7 to March 7. Also, the time period calculation unit 1508 may calculate the time period in units of weeks as in every year from the first week of August to the first week of October, and may calculate a plurality of determination time periods based on a plurality of cycles and time periods.

In step S1903, the determination unit 1507 obtains the capture history table 1700 which is managed by the capture history managing unit 1505. In step S1904, the determination unit 1507 initializes a variable i to 1. In step S1905, the determination unit 1507 obtains the i-th (the ID 1701=i) capture history in the capture history table 1700 obtained in step S1903. Specifically, the determination unit 1507 obtains information of the capture date 1702, image attribute information (the camera type 1703 and the captured scene 1704), and the number of captures 1705 corresponding to the ID 1701=i.

In step S1906, the determination unit 1507 determines whether or not the capture date (the capture date 1702) corresponding to the ID 1701=i is within the determination time period calculated by the time period calculation unit 1508. In step S1907, the determination unit 1507 determines whether or not image attribute information (the camera type 1703 and the captured scene 1704) corresponding to the ID 1701=i matches the item attribute information (the camera type 1603 and the captured scene 1604) obtained in step S1901. In step S1908, the determination unit 1507 determines whether or not the number of captures 1705 corresponding to the ID 1701=i is a predetermined the number of times or more (50 or more times).

In the determinations from step S1906 through step S1908, if anything is determined to be false (No in step S1906, No in step S1907, or No in step S1908), the processing advances to step S1909. In step S1909, the determination unit 1507 adds 1 to the value of i. Also, the determination unit 1507 makes the determinations of step S1906 through step S1908 in relation to the information of the capture date 1702, image attribute information (the camera type 1703 and the captured scene 1704), and the number of captures 1705 corresponding to the ID 1701=i. The determination unit 1507 repeats such processing until the value of i becomes the value of the last ID in the capture history.

In the determinations from step S1906 through step S1908, if everything is determined to be true (Yes in step S1906, Yes in step S1907, or Yes in step S1908), the processing advances to step S1912. In step S1912, the determination unit 1507 determines whether the candidate item corresponding to the information obtained in step S1801 is to be recommended. In step S1910, the determination unit 1507 determines (step S1911) that the candidate item corresponding to the information obtained in step S1801 is not to be recommended if it determines that the i-th ID 1701 is the last ID (Yes in step S1910). After the processing of step S1911 and step S1912, the processing returns to step S1803 of FIG. 18.

As an example, consider a case in which the item type of the candidate item is a telephoto zoom lens, the current date is Aug. 7, 2015, and the determination time period is every year from August 7 to October 7 as described above. In such a case, the determination unit 1507 determines true (Yes) in step S1906 since for capture date 1702=Oct. 3, 2013 which corresponds to ID 1701=17 of the capture history, the determination time period is "every year from August 7 to October 7". Also, the determination unit 1507 determines true (Yes) in step S1907 since the image attribute information (camera type 1703=single lens reflex camera; captured scene 1704=sports) corresponding to ID 1701=17 of the capture history matches on camera type 1603=single lens reflex camera and captured scene 1604=sports. Also, the determination unit 1507 determines true (Yes) in step S1908 since number of captures 1705, which corresponds to ID 1701=17 of the capture history,=133 which is greater than or equal 50 times. As a result, the determination unit 1507 determines that recommendation is for the telephoto zoom lens which is a candidate item.

Note that if there is an image captured with the same item as the candidate item out of the images managed by the image management unit 1502, the determination unit 1507 may determine that the user already has the candidate item and determine not to recommend it. Also, the time period calculation unit 1508 uses a predetermined cycle value to calculate the determination time period in step S1902 in the present embodiment, but another cycle value may also be used. For example, the time period calculation unit 1508 may obtain the capture history table 1700 in step S1903 first and then use a cycle value obtained from a data sequence of the number of captures 1705. For the cycle calculation method, a method of using a discrete Fourier transformation in relation to a data sequence of a number of captures or the like may be considered.

As described above, by virtue of the present embodiment, by using past capture history information, it is possible to recommend an item suited to a captured scene or a camera type that the user is highly likely to capture.

Fourth Embodiment

In the third embodiment, an item recommendation is performed in a case when a candidate item satisfies predetermined conditions, using past capture history. However, in the third embodiment, there is the problem that a product for which sales promotion is desired such as a new product or a product in a sales campaign will not be recommended even once as long as the conditions are not satisfied. To handle this problem, in the present embodiment, a recommendation candidate item is always recommended by calculating a recommendation interval (time interval) using past capture history, but the interval for recommendation can be made shorter the higher the probability that a user will require the item. Differences from the third embodiment will be described below.

Figure 20:
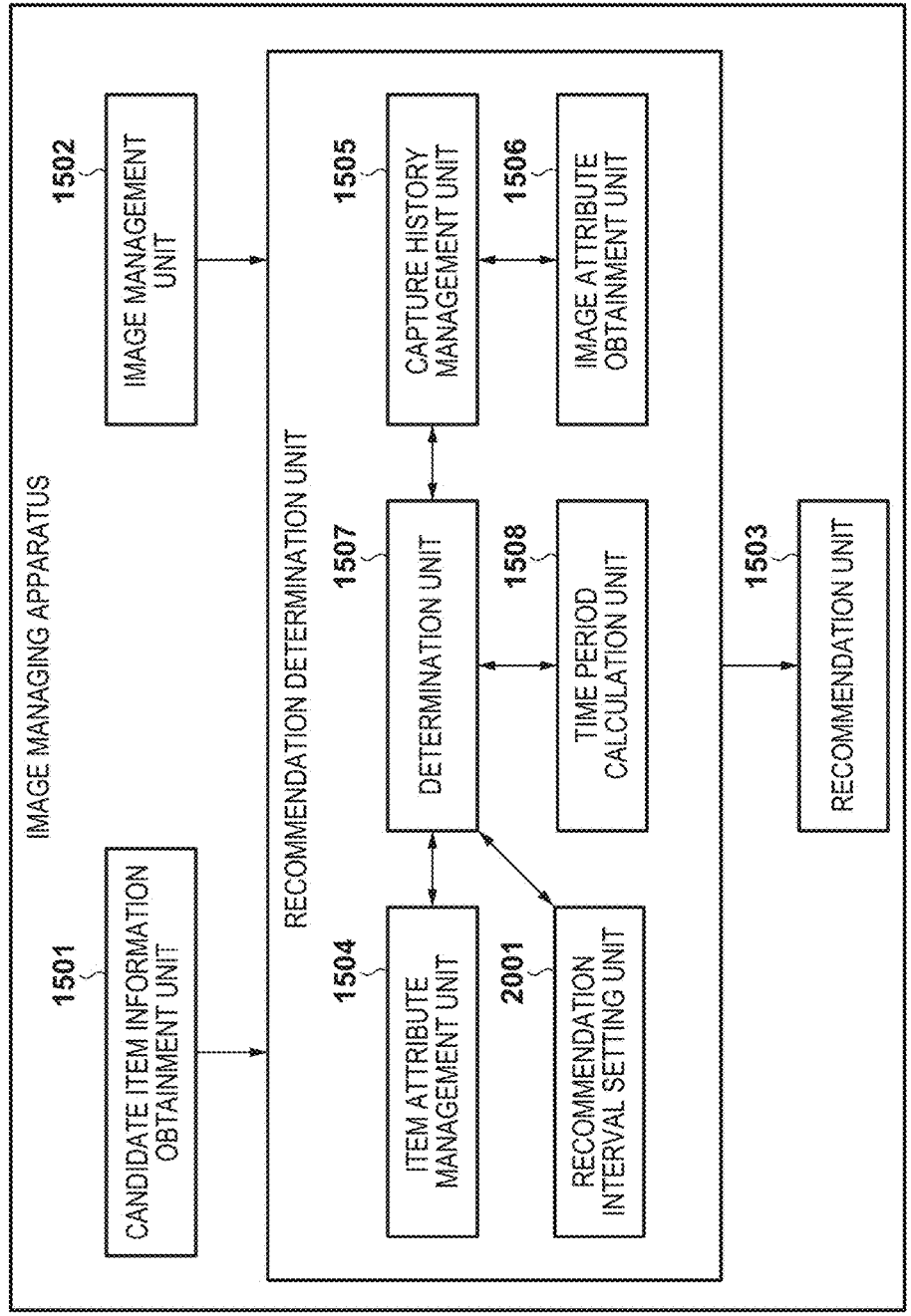
FIG. 20 illustrates an example of a functional configuration of the image managing apparatus in a fourth embodiment.

FIG. 20 illustrates an example of a functional configuration of the image managing apparatus 102 in the present embodiment. The image managing apparatus 102 in the present embodiment as compared to the image managing apparatus 102 of FIG. 15 described in the third embodiment adds a recommendation interval setting unit 2001 to the recommendation determination unit 1509. The recommendation interval setting unit 2001 calculates the recommendation interval based on information of the number of captures 1705 of the capture history table 1700 in the determination time period. The determination unit 1507 makes a recommendation of a candidate item using the recommendation interval calculated by the recommendation interval setting unit 2001.

Figure 21A:
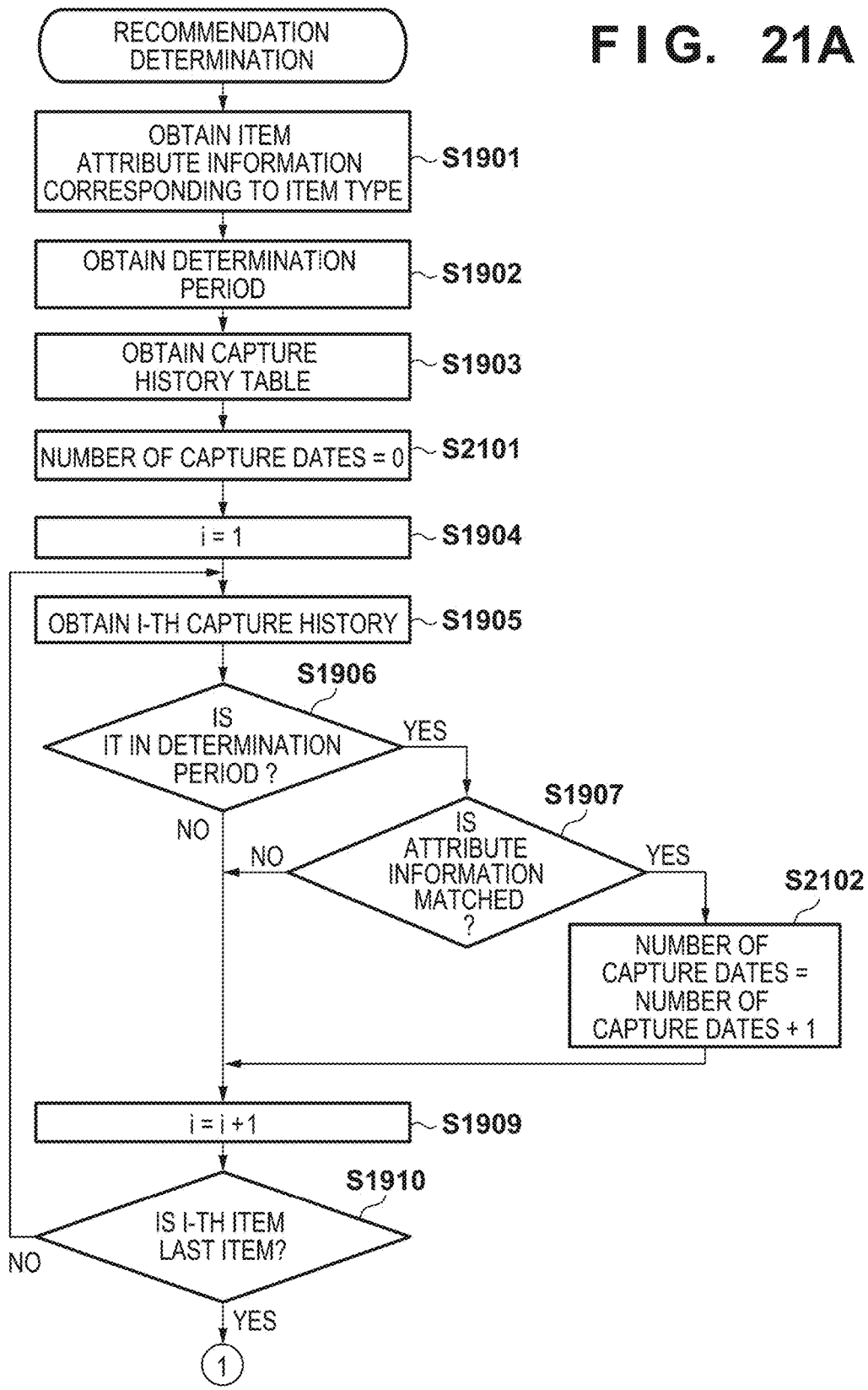
FIGS. 21A and 21B are flowcharts illustrating an operation for determining whether to recommend of a candidate item in the fourth embodiment.
Figure 21B:
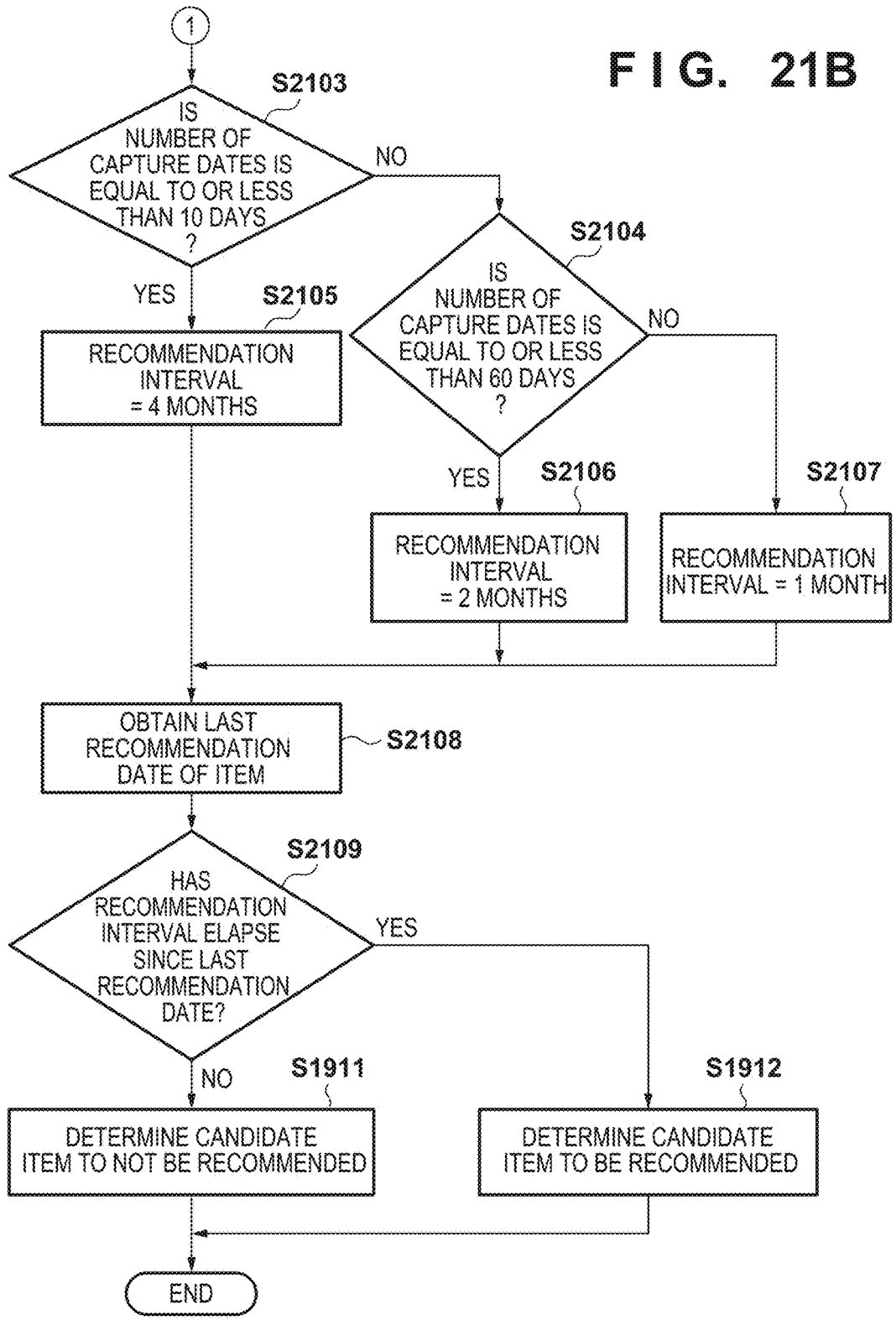

The candidate item recommendation operation by the image managing apparatus 102 in the present embodiment is similar to FIG. 18 described in the third embodiment, but the processing of step S1802 is different so the processing of step S1802 is described. FIGS. 21A and 21B are sub flows of the processing of step S1802 of FIG. 18 and are flowcharts illustrating an operation in which the determination unit 1507 of the recommendation determination unit 1509 in the present embodiment determines whether to recommend a recommendation candidate item. FIGS. 21A and 21B change the operational flow for determining whether to recommend of FIG. 19 so as to use the recommendation interval calculated by the recommendation interval setting unit 2001 to make the determination.

In step S2101, the determination unit 1507 initializes the value of the number of capture dates to 0. In step S2102, if true (Yes) is determined in step S1906 and in step S1907, the determination unit 1507 adds 1 to the number of capture dates. Specifically, the determination unit 1507 adds 1 to the number of capture dates if the capture date 1702 of the i-th capture history obtained in step S1905 is within the determination time period and the image attribute information matches the item attribute information. The determination unit 1507 repeats the processing from step S1905 through step S1909 and step S2102 until it determines that the i-th ID 1701 is the last ID in step S1910. By this, the determination unit 1507 can count the total number of capture dates for images having image attribute information matching the item attribute information in the determination time period.

Step S2103 through step S2107 is an operational flow in which the recommendation interval setting unit 2001 calculates a recommendation interval. In step S2103, the determination unit 1507 determines whether or not the number of capture dates obtained by the processing until step S1910 is less than or equal to a predetermined first threshold (10 days here). If the number of capture dates is less than or equal to the predetermined threshold (Yes in step S2103), the processing advances to step S2105. In step S2105, the recommendation interval setting unit 2001 sets a first recommendation interval (four months here) as the recommendation interval. If the number of capture dates is not less than or equal to the predetermined threshold (No in step S2103), the processing advances to step S2104. In step S2104, the determination unit 1507 determines whether or not the number of capture dates is less than or equal to a second threshold (60 days here) that is larger than the first threshold. If the number of capture dates are less than or equal to the second threshold (Yes in step S2104), the recommendation interval setting unit 2001 sets a second recommendation interval (two months here) that is shorter than the first recommendation interval in step S2106. If the number of capture dates are not less than or equal to the second threshold (No in step S2104), the recommendation interval setting unit 2001 sets a third recommendation interval (one month here) that is shorter than the second recommendation interval in step S2107.

In step S2108, the determination unit 1507 obtains a date (previous recommendation date) on which the same item as the candidate item corresponding to the information obtained in step S1801 was recommended to the user the previous time. Information of the item name of the candidate item that the recommendation unit 1503 recommended and the date, for example, are recorded, and the determination unit 1507 can obtain the previous recommendation date by using this information. In step S2109, the determination unit 1507 determines whether or not the recommendation interval set by the recommendation interval setting unit 2001 has elapsed from the obtained previous recommendation date. Specifically, the determination unit 1507 determines whether or not the number of days from the previous recommendation date until the current date is greater than or equal to the recommendation interval set by the recommendation interval setting unit 2001. If the recommendation interval or longer has elapsed (Yes in step S2109), the determination unit 1507 in step S1912 determines to recommend the candidate item corresponding to the information obtained in step S1801. If the recommendation interval or longer has elapsed (Yes in step S2109), the determination unit 1507 in step S1911 determines not to recommend the candidate item corresponding to the information obtained in step S1801. After the processing of step S1911 and step S1912, the processing returns to step S1803 of FIG. 18.

As described above, by virtue of the present embodiment, by using past capture history information, it is possible to recommend using a short recommendation interval an item suited to a captured scene or a camera type that the user is highly likely to capture from that point onward.

Fifth Embodiment

In the third embodiment, it is determined whether to recommend a candidate item from a capture history, and the item is recommended accordingly. However, there is the problem that if there are a plurality of candidate items to recommend, the capture history is scanned a plurality of times to determine whether to recommend the items, and the processing takes a long time. To handle this problem, in the present embodiment, a recommended item is selected from the capture history, and the capture history scan is only performed one time by recommending a candidate item that matches the selected recommendation item. Differences from the third embodiment will be described below.

Figure 22:
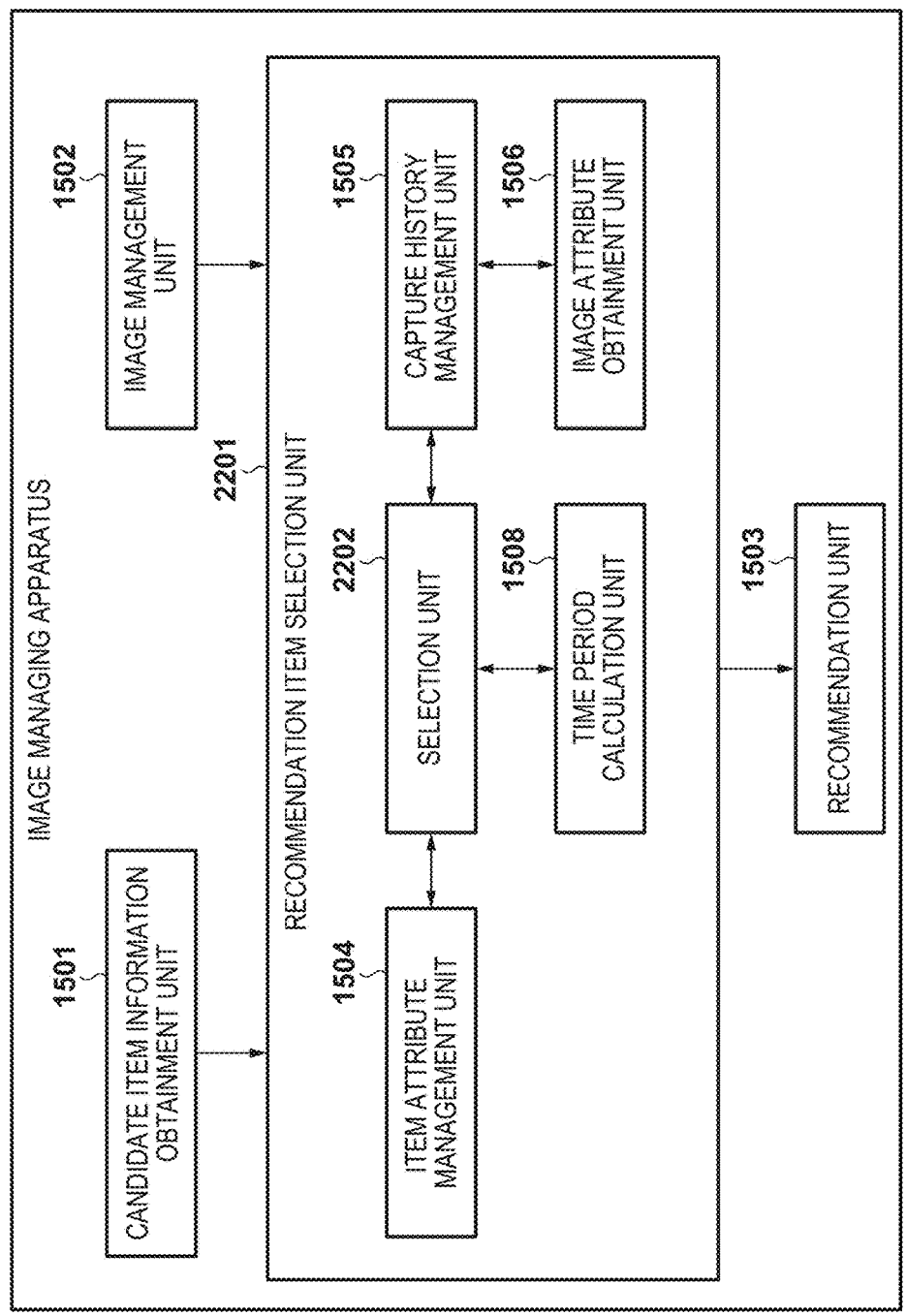
FIG. 22 illustrates an example of a functional configuration of the image managing apparatus in a fourth embodiment.

FIG. 22 illustrates an example of a functional configuration of the image managing apparatus 102 in the present embodiment. The image managing apparatus 102 in the present embodiment as compared to the image managing apparatus 102 of FIG. 15 described in the third embodiment differs in that the recommendation determination unit 1509 is replaced with a recommendation item selection unit 2201. Furthermore, the configuration of the recommendation item selection unit 2201 differs as compared to the recommendation determination unit 1509 of FIG. 15 in that the determination unit 1507 is replaced with a selection unit 2202.

The selection unit 2202 selects the item to recommend from the item attribute information management table 1600 in accordance with the flowchart illustrated in FIG. 25 described later. The image managing apparatus 102 obtains a recommendation candidate item list (hereinafter referred to as the candidate item list) illustrated in FIG. 23 from the management server 101, and recommends a candidate item that matches the selected recommended item.

Figure 23:
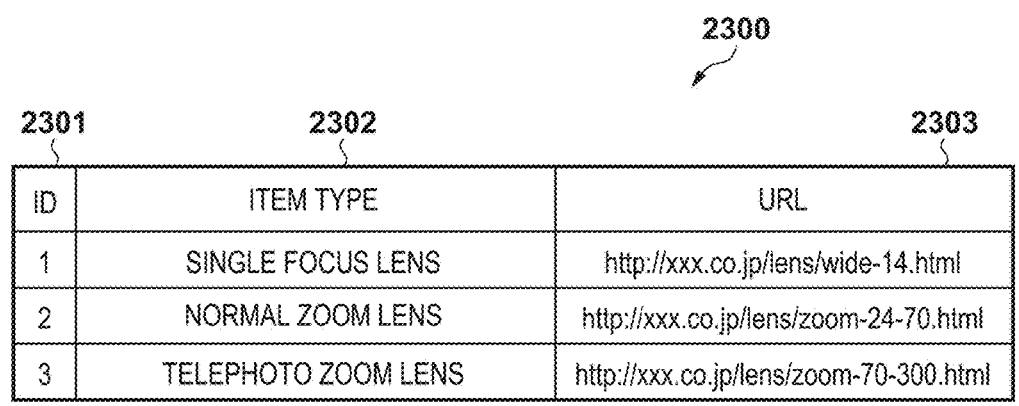
FIG. 23 illustrates an example of a candidate item list.

FIG. 23 illustrates an example of a candidate item list 2300. The candidate item list 2300 is configured from an ID 2301, an item type 2302, and a URL 2303. The ID 2301 is an ID for specifying the respective item type 2302. The item type 2302 is information which represents an item. The URL 2303 is a URL of a Web page in which the information of the item is recited.

Figure 24:
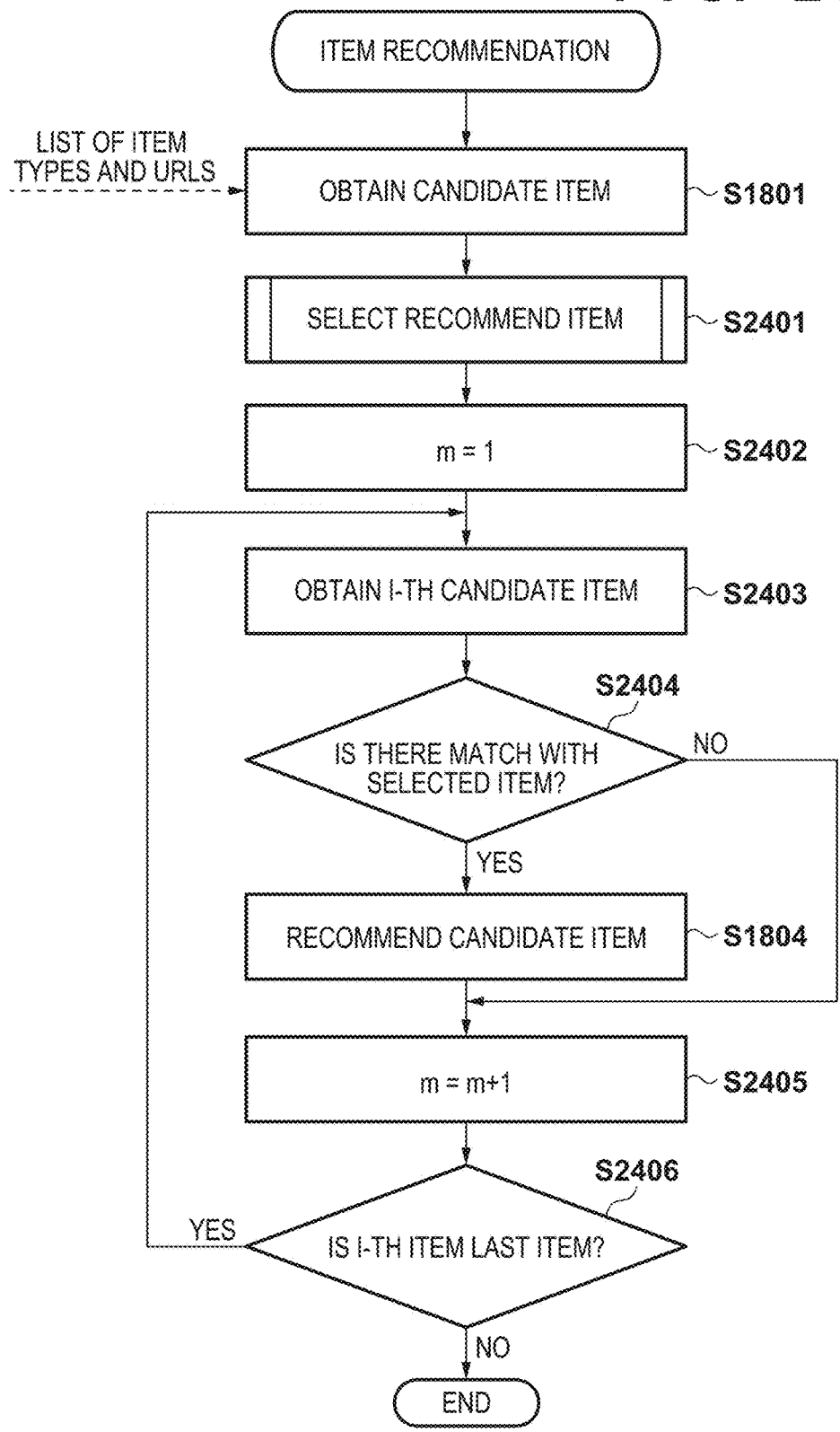
FIG. 24 is a flowchart illustrating an operation for recommending candidate items in a fifth embodiment.

Next, a description regarding processing for determining whether to recommend a candidate item by the image managing apparatus 102 in the present embodiment is given. FIG. 24 is a flowchart illustrating an operation for recommending a candidate item in the present embodiment. FIG. 24 changes the operational flow that makes the recommendation of an item of FIG. 18 so as to use the recommendation item selection unit 1001.

In step S1801, the candidate item information obtainment unit 1501 obtains the candidate item list 2300 illustrated in FIG. 23 from the management server 101. In step S2401, the recommendation item selection unit 2201 selects the recommended item in accordance with the flow of FIG. 25. In step S2402, the selection unit 2202 initializes a variable m. In step S2403, the selection unit 2202 obtains the m-th candidate item from the candidate item list 2300. In step S2404, the selection unit 2202 determines whether or not the recommended item selected in step S2401 and the item type of the m-th candidate item match. The processing is advanced to step S1804 in a case when the item type matches (Yes in step S2404). In step S1804, the recommendation unit 1503, by displaying the Web page of the m-th candidate item on a display which is the output unit 207, recommends that candidate item. After the processing of step S1804 and if the item type does not match (No in step S2404), the processing advances to step S2405. In step S2405, the selection unit 2202 adds 1 to the value of m. The selection unit 2202 repeats the processing of step S2403 through step S2405 and step S1804 until the value of m becomes the last ID number of the candidate item list (Yes in step S2406).

Figure 25:
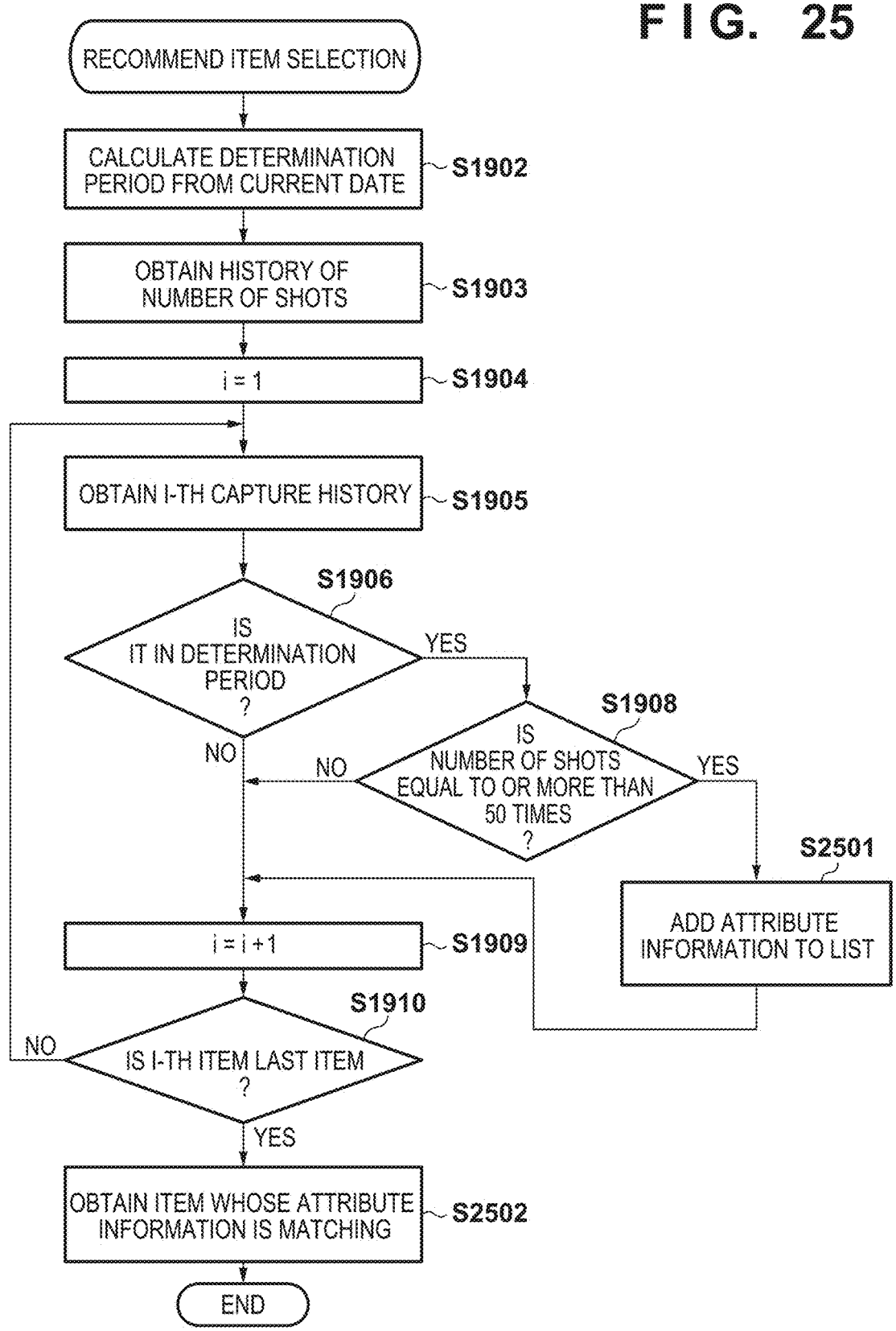
FIG. 25 is a flowchart illustrating an operation for selecting an item to recommend in a fifth embodiment.

FIG. 25 is a sub flow of the processing of step S2401 of FIG. 24, and is a flowchart that illustrates an operation for the selection unit 2202 to select a recommended item. FIG. 25 changes the operational flow for determining whether to recommend of FIG. 19 so as to select the recommended item.

If true (Yes) is determined in step S1906 and in step S1907, the selection unit 2202 adds the image attribute information (the camera type 1703 and the captured scene 1704) corresponding to ID 1701=i of the capture history to the list in step S2501. Specifically, the selection unit 2202 adds the image attribute information to the list if the capture date 1702 of the i-th capture history obtained in step S1905 is within the determination time period and the image attribute information matches the item attribute information. The selection unit 2202 repeats the processing from step S1905 through step S1909 and step S2501 until it determines that the i-th ID 1701 is the last ID. By this, the selection unit 2202 obtains image attribute information for which the number of captures in the determination time period is the predetermined number of times or more.

In step S2502, the selection unit 2202 selects, as the recommended item from the item attribute information management table 1600, the item having item attribute information that matches the image attribute information added to the list in step S2501. If there are a plurality of pieces of image attribute information in the list, the selection unit 2202 may select a plurality of recommended items. In such a case, the selection unit 2202, in step S2404 of FIG. 24, determines whether any of the plurality of recommendation items match, and in step S1804, the recommendation unit 1503 recommends the candidate item determined to match in step S2404.

As described above, by virtue of the present embodiment, it is possible to select an item suited to the captured scene or a camera type that the user is highly likely to capture from that point onwards by scanning a capture history one time, and to then recommend the item.

In this way, by virtue of the embodiments described above, it becomes possible to recommend image capturing equipment is suitable to an object or an environment that the user is highly likely to capture from that point onward.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122876, filed Jun. 21, 2016, and Japanese Patent Application No. 2016-122877, filed Jun. 21, 2016 which are hereby incorporated by reference herein in their entirety.

What is claimed is:

1. An information processing apparatus operable to decide an item related to an image or image capturing for a recommendation to a user, the apparatus comprising:
   an obtainment unit configured to obtain image attribute information;
   a derivation unit configured to derive image group attribute information for an image group including a plurality of images based on the image attribute information;
   a comparison unit configured to compare image group attribute information that the derivation unit derived for a first image group including images captured in a first time range and image group attribute information that the derivation unit derived for a second image group including images captured in a second time range different to the first time range; and
   a decision unit configured to decide the item for the recommendation to the user in accordance with a result of the comparison by the comparison unit.

2. The information processing apparatus according to claim 1, further comprising a presentation unit configured to present the item decided by the decision unit for the recommendation to the user.

3. The information processing apparatus according to claim 2, wherein the presentation unit presents to the user by causing a display unit to display information of the item decided by the decision unit.

4. The information processing apparatus according to claim 1, wherein
   the derivation unit comprises:
   a setting unit configured to set a candidate item for the recommendation to the user;
   a first derivation unit configured to derive image group attribute information of an image captured using the candidate item among the images of the first image group; and a second derivation unit configured to derive image group attribute information of an image captured using the candidate item among the images of the second image group, and wherein the comparison unit compares the image group attribute information derived by each of the first derivation unit and the second derivation unit.

5. The information processing apparatus according to claim 1, wherein the derivation unit comprises:

a setting unit configured to set a candidate item for the recommendation to the user;

a first derivation unit configured to derive as the image group attribute information a ratio of a number of images captured using the candidate item among a total number of images of the first image group; and a second derivation unit configured to derive as the image group attribute information a ratio of a number of images captured using the candidate item among a total number of the images of the second image group; and wherein the comparison unit compares the ratios derived by each of the first derivation unit and the second derivation unit, and the decision unit decides the candidate item as the item to recommend to the user if the difference of the ratios is greater than a threshold.

6. The information processing apparatus according to claim 4, wherein the first time range is a latest predetermined time period with respect to a timing at which the item is decided to be recommended to the user, and the second time range is a predetermined time period prior to the first time range.

7. The information processing apparatus according to claim 1, wherein the derivation unit has a first derivation unit configured to derive as the image group attribute information two or more time ranges in which an image having a predetermined object, among the images of the first image group, is captured and a second derivation unit configured to derive as the image group attribute information two or more time ranges in which an image having a predetermined object, among the images of the second image group, is captured, and the comparison unit compares an average of intervals between the time ranges derived by the first derivation unit and an average of intervals between the time ranges derived by the second derivation unit, and the decision unit, if the difference between the two averages of the intervals is larger than a predetermined threshold, decides an item corresponding to a capture of the predetermined object as the item for the recommendation to the user.

8. The information processing apparatus according to claim 6, wherein the item corresponding to the capture of the predetermined object is decided in advance, and is an item suitable for capturing the predetermined object.

9. The information processing apparatus according to claim 7, wherein the predetermined object is an object that is a capturing target at the highest frequency, among the images of the first image group.

10. A method of controlling an information processing apparatus operable to decide an item related to an image or image capturing for a recommendation to a user, the apparatus comprising:

obtaining image attribute information;

deriving image group attribute information for an image group including a plurality of images based on the image attribute information;

comparing image group attribute information derived for a first image group including images captured in a first time range and image group attribute information derived for a second image group including images captured in a second time range different to the first time range; and deciding the item for the recommendation to the user in accordance with a result of the comparison.

11. A non-transitory computer-readable storage medium storing a computer program for causing a computer to execute a control method of an information processing apparatus operable to decide an item related to an image or image capturing for a recommendation to a user, the method comprising: obtaining image attribute information;

deriving image group attribute information for an image group including a plurality of images based on the image attribute information;

comparing image group attribute information derived for a first image group including images captured in a first time range and image group attribute information derived for a second image group including images captured in a second time range different to the first time range; and deciding the item for the recommendation to the user in accordance with a result of the comparison.

* * * * *